US012756801B2

(12) United States Patent
Saigo

(10) Patent No.: US 12,756,801 B2
(45) Date of Patent: Oct. 6, 2026

(54) DISPLAY SYSTEM, NON-TRANSITORY COMPUTER-READABLE STORAGE MEDIUM STORING PROGRAM, AND CONTROL DEVICE

(71) Applicant: SEIKO EPSON CORPORATION, Tokyo (JP)

(72) Inventor: Manabu Saigo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 366 days.

(21) Appl. No.: 18/616,487

(22) Filed: Mar. 26, 2024

(65) Prior Publication Data

US 2024/0333887 A1 Oct. 3, 2024

(30) Foreign Application Priority Data

Mar. 27, 2023 (JP) ................................ 2023-049543

(51) Int. Cl.
*G03B 21/14* (2006.01)
*H04N 9/31* (2006.01)

(52) U.S. Cl.
CPC ......... *H04N 9/3155* (2013.01); *H04N 9/3164* (2013.01); *H04N 9/3194* (2013.01)

(58) Field of Classification Search
CPC .... H04N 9/3182; H04N 9/3179; G03B 21/14; G03B 21/147
See application file for complete search history.

(56) References Cited

U.S. PATENT DOCUMENTS

2018/0220112 A1 8/2018 Miichi

FOREIGN PATENT DOCUMENTS

| | | |
|---|---|---|
| JP | 2012-108167 A | 6/2012 |
| JP | 2021-022528 A | 2/2021 |
| JP | 2021-022538 A | 2/2021 |
| JP | 2021-072546 A | 5/2021 |
| JP | 2021-108469 A | 7/2021 |
| WO | 2017/033384 A1 | 3/2017 |

OTHER PUBLICATIONS

"Multi-Manager Ex: Wireless Dimming-and-Toning System", Panasonic Corporation, Feb. 2, 2023.
"Examples of Ambiences Created with "BioSHADOW" and Built-in Content at Various Scenes: Public Transport Facilities, Underground Passages, etc.", Panasonic Corporation, Mar. 28, 2022.

*Primary Examiner* — Ryan D Howard
(74) *Attorney, Agent, or Firm* — Oliff PLC

(57) ABSTRACT

A display system includes a control device configured to control a first lighting device, a second lighting device, and a projector. The control device executes an operation of determining a correction value indicating a degree of contrast correction of the projector based on first position information indicating a first position at which the first lighting device is disposed, second position information indicating a second position at which the second lighting device is disposed, predetermined position information indicating a predetermined position onto which the projector projects a projection image, a first maximum light amount indicating a maximum value of a light amount of the first lighting device, a second maximum light amount indicating a maximum value of a light amount of the second lighting device, and a dimming level.

10 Claims, 10 Drawing Sheets

DISPLAY SYSTEM, NON-TRANSITORY COMPUTER-READABLE STORAGE MEDIUM STORING PROGRAM, AND CONTROL DEVICE

The present application is based on, and claims priority from JP Application Serial Number 2023-049543, filed Mar. 27, 2023, the disclosure of which is hereby incorporated by reference herein in its entirety.

BACKGROUND

1. Technical Field

The present disclosure relates to a display system, a non-transitory computer-readable storage medium storing a program, and a control device.

2. Related Art

For example, JP-A-2021-22538 discloses a technique of controlling brightness and a color temperature of a lighting device based on a sensing result of a video projected by a projector when the lighting device and the projector are provided in the same space.

JP-A-2021-22538 is an example of the related art.

SUMMARY

In the technique disclosed in JP-A-2021-22538, since each of a plurality of the lighting devices adjusts the brightness and the color temperature based on the sensing result of the projector, visibility of a projection image of the projector can be improved. However, the lighting device may be set dark and brightness in the space is insufficient. As a result, it may be difficult to improve the visibility of the projection image of the projector while ensuring the brightness of the lighting device.

An aspect of the present disclosure is a display system including: a first lighting device disposed at a first position of a ceiling; a second lighting device disposed at a second position of the ceiling different from the first position; a projector disposed at a specific position of the ceiling different from the first position and the second position and configured to project an image onto a predetermined position of a wall surface or a floor surface on which a part of a light from at least the first lighting device is incident; and a control device configured to control the first lighting device, the second lighting device, and the projector, in which the control device executes operations including: acquiring first position information indicating the first position, second position information indicating the second position, and predetermined position information indicating the predetermined position; accepting a first maximum light amount indicating a maximum value of a light amount of the first lighting device and a second maximum light amount indicating a maximum value of a light amount of the second lighting device; accepting a dimming level for adjusting the light amount of the first lighting device and the light amount of the second lighting device; and determining a correction value indicating a degree of contrast correction of the projector based on the first position information, the second position information, the predetermined position information, the first maximum light amount, the second maximum light amount, and the dimming level.

Another aspect of the present disclosure is a non-transitory computer-readable storage medium storing a program for controlling a first lighting device disposed at a first position of a ceiling, a second lighting device disposed at a second position of the ceiling different from the first position, and a projector disposed at a specific position of the ceiling different from the first position and the second position and configured to project an image onto a predetermined position of a wall surface or a floor surface on which a part of a light from at least the first lighting device is incident, the program causing a processor to execute operations including: acquiring first position information indicating the first position, second position information indicating the second position, and predetermined position information indicating the predetermined position; accepting a first maximum light amount indicating a maximum value of a light amount of the first lighting device and a second maximum light amount indicating a maximum value of a light amount of the second lighting device; accepting a dimming level for adjusting the light amount of the first lighting device and the light amount of the second lighting device; and determining a correction value indicating a degree of contrast correction of the projector based on the first position information, the second position information, the predetermined position information, the first maximum light amount, the second maximum light amount, and the dimming level.

Yet another aspect of the present disclosure is a control device for controlling a first lighting device disposed at a first position of a ceiling, a second lighting device disposed at a second position of the ceiling different from the first position, and a projector disposed at a specific position of the ceiling different from the first position and the second position and configured to project an image onto a predetermined position of a wall surface or a floor surface on which a part of a light from at least the first lighting device is incident, the control device including: at least one processor, in which the at least one processor executes operations including: acquiring first position information indicating the first position, second position information indicating the second position, and predetermined position information indicating the predetermined position; accepting a first maximum light amount indicating a maximum value of a light amount of the first lighting device and a second maximum light amount indicating a maximum value of a light amount of the second lighting device; accepting a dimming level for adjusting the light amount of the first lighting device and the light amount of the second lighting device; and determining a correction value indicating a degree of contrast correction of the projector based on the first position information, the second position information, the predetermined position information, the first maximum light amount, the second maximum light amount, and the dimming level.

DESCRIPTION OF EMBODIMENTS

Hereinafter, an embodiment will be described with reference to the drawings.

Figure 1:
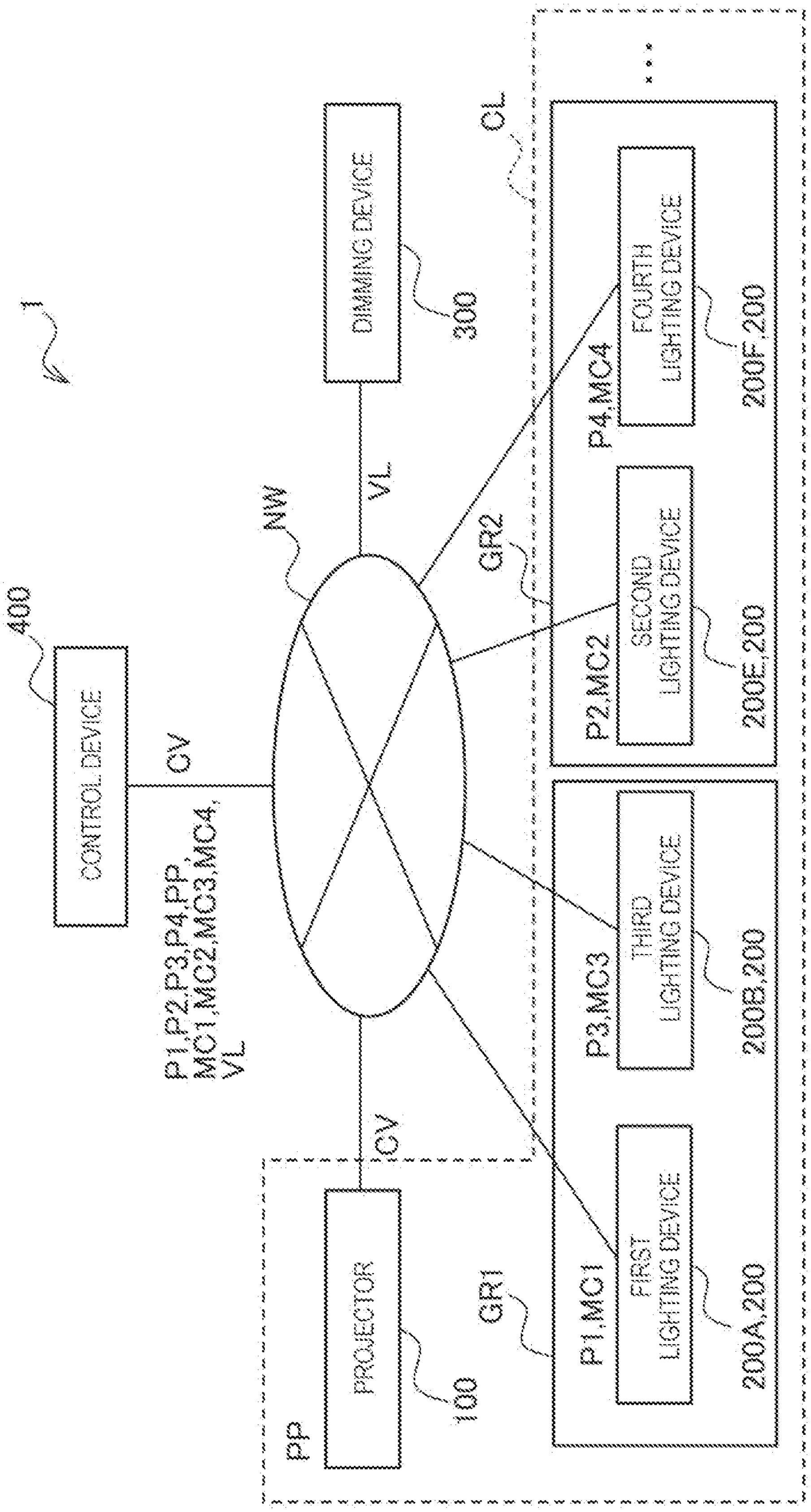
FIG. 1 is a diagram illustrating an example of a configuration of a display system according to an embodiment.

FIG. 1 is a diagram illustrating an example of a configuration of a display system 1 according to the embodiment. The display system 1 includes a projector 100, lighting devices 200, a dimming device 300, and a control device 400. The control device 400 can communicate with the projector 100, the lighting devices 200, and the dimming device 300 via a network NW.

In the embodiment, the network NW is, for example, a local area network (LAN), and is not limited thereto. The network NW may be, for example, a wide area network (WAN). In addition, the network NW may be, for example, the Internet.

The projector 100 is disposed at a specific position PP of a ceiling CL and projects an image light PL onto, for example, a floor surface FL. The projector 100 projects the image light PL to display a projection image PM at a predetermined position PC of the floor surface FL. The predetermined position PC indicates a center position of the projection image PM displayed on the floor surface FL.

In the embodiment, a case is described in which the projector 100 displays the projection image PM on the floor surface FL, and the present disclosure is not limited thereto. The projector 100 may display the projection image PM on a wall surface such as a side wall.

The projection image PM corresponds to an example of an "image".

The lighting devices 200 are disposed at the ceiling CL and emit lighting lights to the floor surface FL. The lighting devices 200 include a first lighting device 200A, a second lighting device 200E, a third lighting device 200B, and a fourth lighting device 200F.

The first lighting device 200A and the third lighting device 200B are provided in a first group GR1. The second lighting device 200E and the fourth lighting device 200F are provided in a second group GR2.

The first group GR1 and the second group GR2 will be further described with reference to FIGS. 2 and 4.

The first lighting device 200A is disposed at a first position P1 of the ceiling CL. A maximum value of a light amount of the first lighting device 200A is a first maximum light amount MC1. The second lighting device 200E is disposed at a second position P2 of the ceiling CL. The second position P2 is different from the first position P1. A maximum value of a light amount of the second lighting device 200E is a second maximum light amount MC2. The third lighting device 200B is disposed at a third position P3 of the ceiling CL. The third position P3 is different from the first position P1 and the second position P2. A maximum value of a light amount of the third lighting device 200B is a third maximum light amount MC3. The fourth lighting device 200F is disposed at a fourth position P4 of the ceiling CL. The fourth position P4 is different from the first position P1, the second position P2, and the third position P3. A maximum value of a light amount of the fourth lighting device 200F is a fourth maximum light amount MC4.

In the embodiment, the first maximum light amount MC1, the second maximum light amount MC2, the third maximum light amount MC3, and the fourth maximum light amount MC4 are the same.

The first position P1 to the fourth position P4 will be further described with reference to FIG. 2.

The dimming device 300 accepts an operation from a user, and sets a dimming level VL for adjusting a light amount of the lighting device 200 according to the operation. The dimming level VL is set to, for example, values of "0" to "1". When the dimming level VL is set to "0", the lighting device 200 is turned off. When the dimming level VL is set to "1", the lighting device 200 emits the lighting light to the floor surface FL at a maximum light amount.

Each time the dimming level VL is adjusted, the dimming device 300 transmits the dimming level VL to the control device 400.

The control device 400 is implemented by, for example, a personal computer. The control device 400 acquires the first maximum light amount MC1 and first position information JP1 indicating the first position P1 from the first lighting device 200A. The control device 400 acquires the second maximum light amount MC2 and second position information JP2 indicating the second position P2 from the second lighting device 200E. The control device 400 acquires the third maximum light amount MC3 and third position information JP3 indicating the third position P3 from the third lighting device 200B. Further, the control device 400 acquires the fourth maximum light amount MC4 and fourth position information JP4 indicating the fourth position P4 from the fourth lighting device 200F.

The control device 400 determines a correction value CV indicating a degree of contrast correction of the projector 100 based on the first position P1, the second position P2, the specific position PP, the first maximum light amount MC1, the second maximum light amount MC2, and the dimming level VL. Then, the control device 400 transmits the correction value CV to the projector 100. The projector 100 executes the contrast correction of the projection image PM based on the correction value CV.

In the embodiment, the control device 400 is communicably connected to the projector 100, the lighting devices 200, and the dimming device 300 in a wired manner via Ethernet (registered trademark) cable or the like, and the control device 400 may be communicably connected thereto in a wireless manner via Wi-Fi (registered trademark) or the like.

In the embodiment, the control device 400 is implemented by a personal computer. The control device 400 may be implemented by a tablet terminal, a smartphone, or the like.

Next, arrangement of the projector 100 and the lighting devices 200 will be described with reference to FIG. 2. FIG. 2 is a plan view illustrating an example of the arrangement of the projector 100 and the lighting devices 200.

Figure 2:
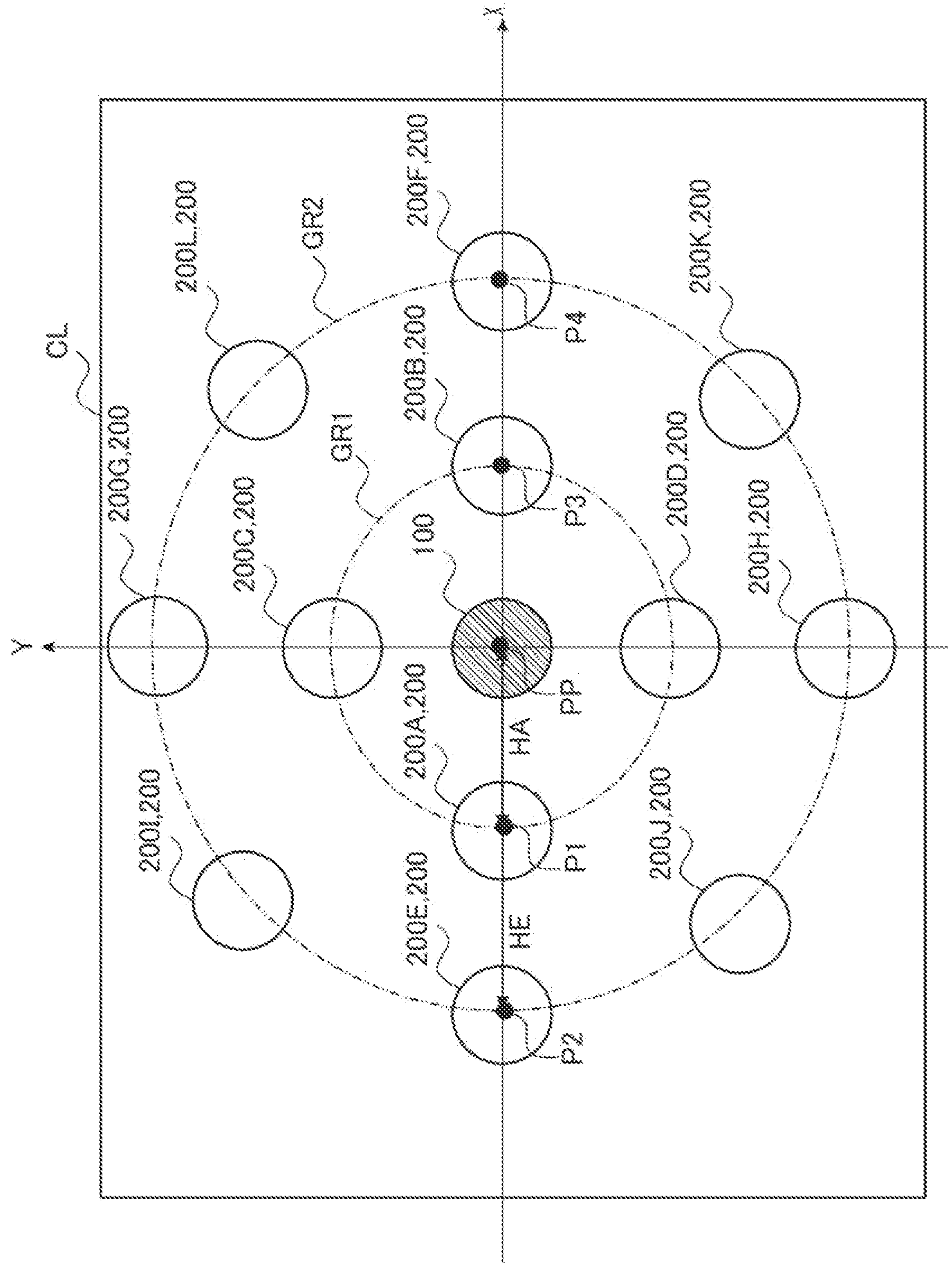
FIG. 2 is a plan view illustrating an example of arrangement of a projector and lighting devices.

As illustrated in FIG. 2, in the embodiment, the lighting devices 200 are disposed around the projector 100 at a circumference centered on the specific position PP at which the projector 100 is disposed.

The lighting devices 200 constituting the first group GR1 are disposed at a circumference of a radius HA centered on the specific position PP. The first group GR1 includes the first lighting device 200A, the third lighting device 200B, a lighting device 200C, and a lighting device 200D. The four lighting devices 200 constituting the first group GR1 are disposed to form 90 degrees with one another.

The lighting devices 200 constituting the second group GR2 are disposed at a circumference of a radius HE centered on the specific position PP. The radius HE is, for example, twice the radius HA. The second group GR2 includes the second lighting device 200E, the fourth lighting device 200F, a lighting device 200G, a lighting device 200H, a lighting device 200I, a lighting device 200J, a lighting device 200K, and a lighting device 200L. The eight lighting devices 200 constituting the second group GR2 are disposed to form 45 degrees with one another.

As illustrated in FIG. 2, an X axis and a Y axis are set with the specific position PP as an origin. The X axis extends in a left-right direction in the drawing, and the Y axis extends in an up-down direction in the drawing. A positive direction of the X axis indicates a right direction, and a positive direction of the Y axis indicates an upward direction. A position of the projector 100 and positions of the lighting devices 200 are represented by an X coordinate and a Y coordinate.

For example, the specific position PP, which is the position of the projector 100, is represented by (0, 0). For example, the first position P1, which is the position of the first lighting device 200A, is represented by (−HA, 0). The second position P2, which is the position of the second lighting device 200E, is represented by (−HE, 0). The third position P3, which is the position of the third lighting device 200B, is represented by (HA, 0). The fourth position P4, which is the position of the fourth lighting device 200F, is represented by (HE, 0).

Figure 3:
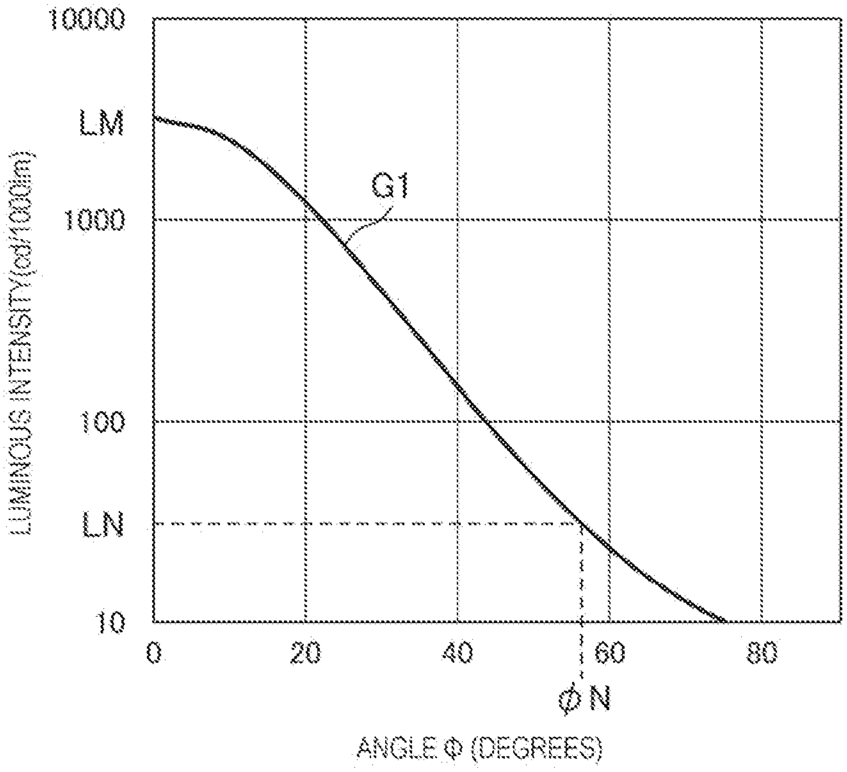
FIG. 3 is a graph illustrating an example of a light distribution characteristic of the lighting device.

Next, a light distribution characteristic of the lighting device 200 will be described with reference to FIG. 3. FIG. 3 is a graph illustrating an example of the light distribution characteristic of the lighting device 200.

In FIG. 3, a horizontal axis represents an angle φ, and a vertical axis represents a luminous intensity. In the embodiment, the lighting device 200 is disposed at the ceiling CL and irradiates the floor surface FL. The lighting device 200 is disposed toward the floor surface FL immediately below a position at which the lighting device 200 is disposed. The angle φ is an angle formed with a directly downward direction.

As illustrated in a graph G1 of FIG. 3, the light amount of the lighting device 200 takes a maximum value LM at the angle q of "0 degree", and decreases as the angle φ increases. For example, when the angle φ is an angle φN, the light amount of the lighting device 200 is a light amount LN that is a light amount of 1/100 of the maximum value LM. In the embodiment, for convenience, the angle φN is defined as a spread angle of the lighting device 200. The angle φN is about 55 degrees.

The graph G1 of FIG. 3 is represented by a light distribution function FH (φ). In other words, the light distribution function FH (φ) indicates the light distribution characteristic illustrated in FIG. 3. The light distribution function FH (φ) will be further described with reference to FIG. 6.

Next, the arrangement of the projector 100 and the lighting devices 200 will be described with reference to FIG. 4. FIG. 4 is a side view illustrating an example of the arrangement of the projector 100 and the lighting devices 200.

Figure 4:
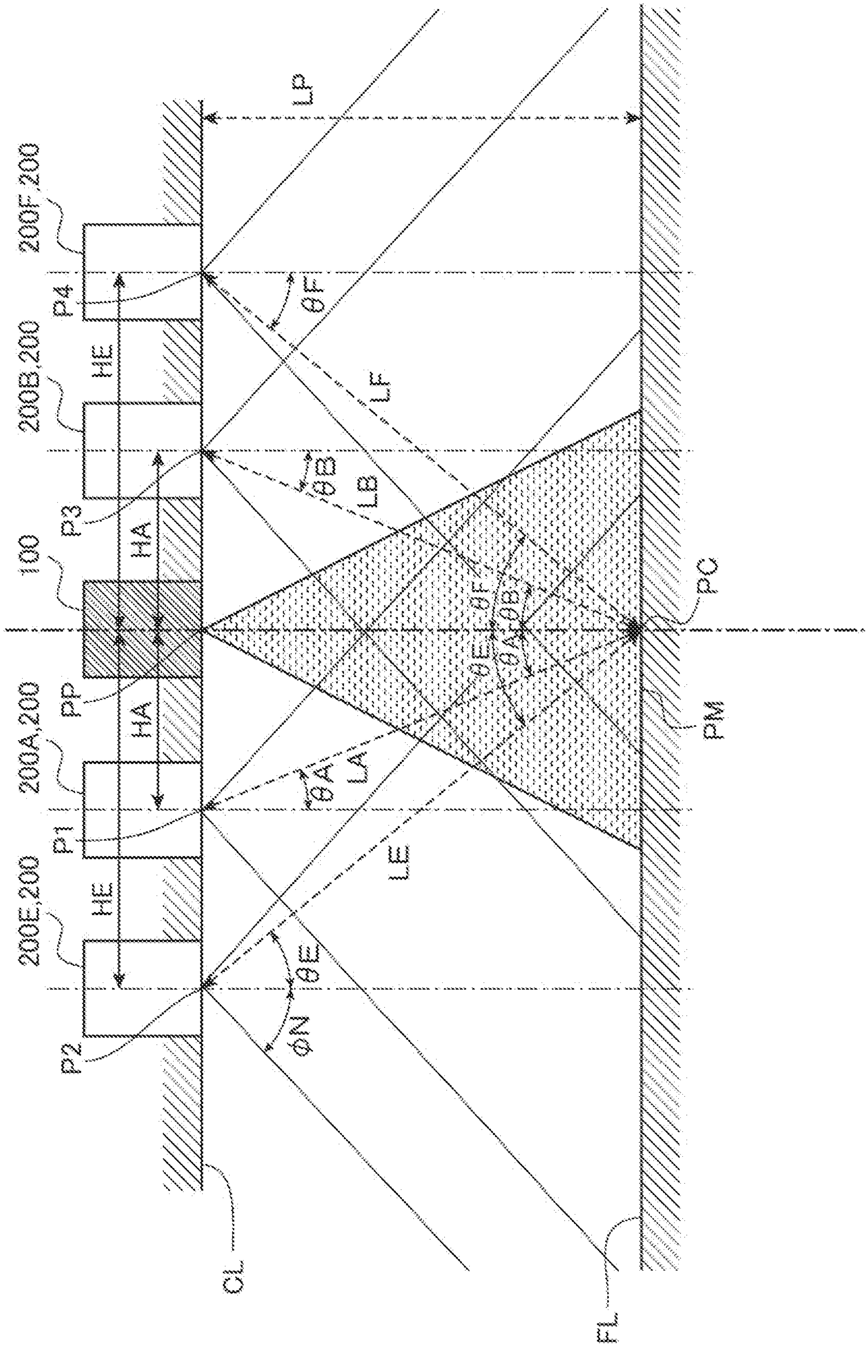
FIG. 4 is a side view illustrating an example of arrangement of the projector and the lighting devices.

As illustrated in FIG. 4, the projector 100 is disposed at the ceiling CL and displays the projection image PM on the floor surface FL by projecting the image light PL toward the floor surface FL.

The first lighting device 200A and the second lighting device 200E are disposed on a left side of the projector 100. A distance between a center position of the first lighting device 200A and a center position of the projector 100 coincides with a value of the radius HA. A distance between a center position of the second lighting device 200E and the center position of the projector 100 coincides with a value of the radius HE. The radius HE is, for example, twice the radius HA.

The third lighting device 200B and the fourth lighting device 200F are disposed on a right side of the projector 100. A distance between a center position of the third lighting device 200B and the center position of the projector 100 coincides with the value of radius HA. A distance between a center position of the fourth lighting device 200F and the center position of the projector 100 coincides with the value of the radius HE.

A first distance LA is a length of a line segment coupling the center position of the first lighting device 200A and the predetermined position PC. A line segment indicating the first distance LA is the line segment coupling the center position of the first lighting device 200A and the predetermined position PC. The predetermined position PC is the center position of the projection image PM. A second distance LE is a length of a line segment coupling the center position of the second lighting device 200E and the predetermined position PC. A line segment indicating the second distance LE is the line segment coupling the center position of the second lighting device 200E and the predetermined position PC.

A first incident angle θA is an angle at which a light emitted from the first lighting device 200A is incident on the predetermined position PC. That is, the first incident angle θA is an angle formed by a dashed line passing through the center position of the projector 100 and extending in a vertical direction and the line segment indicating the first distance LA. The first incident angle θA coincides with an angle formed by a dashed line passing through the center position of the first lighting device 200A and extending in the vertical direction and the line segment indicating the first distance LA.

A second incident angle θE is an angle at which a light emitted from the second lighting device 200E is incident on the predetermined position PC. That is, the second incident angle θE is an angle formed by the dashed line passing through the center position of the projector 100 and extending in the vertical direction and the line segment indicating the second distance LE. The second incident angle θE coincides with an angle formed by a dashed line passing through the center position of the second lighting device 200E and extending in the vertical direction and the line segment indicating the second distance LE.

A third incident angle θB coincides with the first incident angle θA. The third incident angle θB is an angle at which a light emitted from the third lighting device 200B is incident on the predetermined position PC.

A fourth incident angle θF coincides with the second incident angle θE. The fourth incident angle θF is an angle at which a light emitted from the fourth lighting device 200F is incident on the predetermined position PC.

Further, FIG. 4 illustrates the angle φN. The angle φN is about 55 degrees. As described with reference to FIG. 3, when the angle φ is the angle φN, the light amount of the lighting device 200 is the light amount LN that is a light amount of 1/100 of the maximum value LM.

Figure 5:
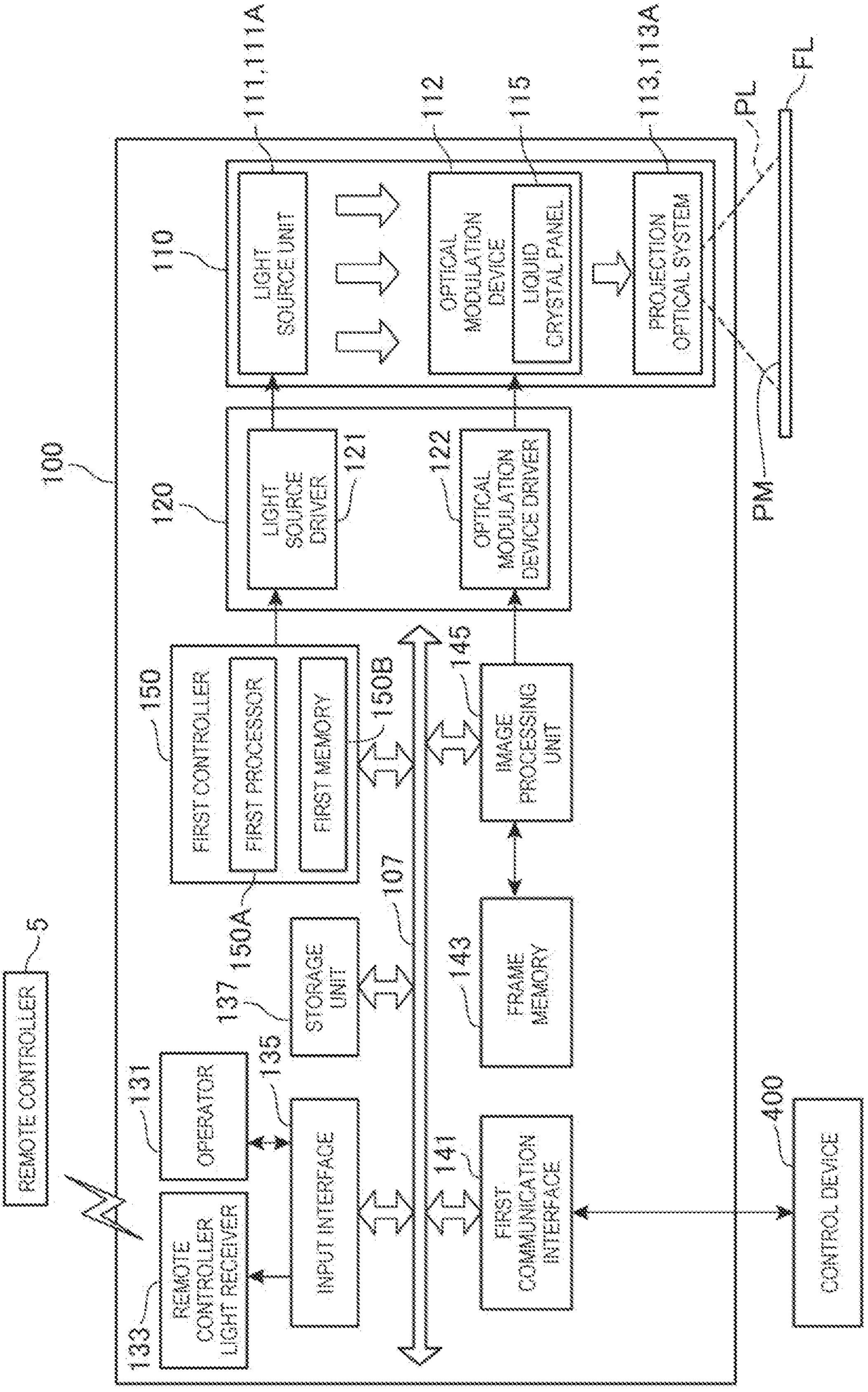
FIG. 5 is a diagram illustrating an example of a configuration of the projector.

Next, a configuration of the projector 100 will be described with reference to FIG. 5. FIG. 5 is a diagram illustrating an example of the configuration of the projector 100 according to the embodiment.

As illustrated in FIG. 5, the projector 100 includes a projection unit 110 and a driver 120 that drives the projection unit 110. The projection unit 110 forms an optical image and projects the image light PL onto the floor surface FL. In the embodiment, the projection unit 110 projects the image light PL corresponding to the projection image PM onto the floor surface FL.

The projection unit 110 includes a light source unit 111, an optical modulation device 112, and a projection optical system 113. The driver 120 includes a light source driver 121 and an optical modulation device driver 122.

The light source unit 111 includes a light source 111A. The light source 111A is, for example, a solid light source such as a light emitting diode (LED) or a laser light source.

In the embodiment, a case will be described in which the light source 111A of the light source unit 111 is a solid light source, and the present disclosure is not limited thereto. The light source 111A of the light source unit 111 may be a lamp light source such as a halogen lamp, a xenon lamp, or an ultra-high pressure mercury lamp.

The light source unit 111 may include a reflector and an auxiliary reflector that guide a light emitted from the light source 111A to the optical modulation device 112. The light source unit 111 may further include a lens group for increasing an optical characteristic of a projection light, a polarizing plate, or a dimming element for reducing a light amount of the light emitted from the light source on a path leading to the optical modulation device 112.

The light source driver 121 is coupled to an internal bus 107, and turns on and off the light source 111A of the light source unit 111 according to an instruction from a first controller 150, which is also coupled to the internal bus 107, to control an output of the light source.

The optical modulation device 112 includes, for example, three liquid crystal panels 115 corresponding to three primary colors including R, G, and B. R represents red, G represents green, and B represents blue. That is, the optical modulation device 112 includes the liquid crystal panel 115 corresponding to an R color light, the liquid crystal panel 115 corresponding to a G color light, and the liquid crystal panel 115 corresponding to a B color light.

A light emitted by the light source unit 111 is separated into three color lights of RGB to be incident on the corresponding liquid crystal panel 115. Each of the three liquid crystal panels 115 is a transmissive liquid crystal panel, and modulates the transmitted light to generate a first image light. The first image lights modulated while passing through the respective liquid crystal panels 115 are combined by a combining optical system such as a cross dichroic prism, and are emitted to the projection optical system 113.

In the embodiment, a case will be described in which the optical modulation device 112 includes the transmissive liquid crystal panels 115 as an optical modulation element, and the present disclosure is not limited thereto. The optical modulation element may be a reflection-type liquid crystal panel or a digital micromirror device.

The optical modulation device 112 is driven by the optical modulation device driver 122. The optical modulation device driver 122 is coupled to an image processing unit 145.

Image data corresponding to each primary color of R, G, and B is input from the image processing unit 145 to the optical modulation device driver 122. The optical modulation device driver 122 converts the input image data into a data signal suitable for an operation of the liquid crystal panel 115. The optical modulation device driver 122 applies, based on the data signal obtained by the conversion, a voltage to each pixel of each liquid crystal panel 115 and draws an image on each liquid crystal panel 115.

The projection optical system 113 includes a projection lens, a mirror, and the like that focus the incident image light PL on the floor surface FL. The projection optical system 113 further includes a zoom mechanism that enlarges or reduces an image projected onto the floor surface FL, a focus adjustment mechanism that adjusts a focus, a lens shift mechanism that adjusts a projection direction of the image light PL, and the like.

The projector 100 further includes an operator 131, a remote controller light receiver 133, an input interface 135, a storage unit 137, a first communication interface 141, a frame memory 143, the image processing unit 145, and the first controller 150. The input interface 135, the storage unit 137, the first communication interface 141, the image processing unit 145, and the first controller 150 are connected with one another via the internal bus 107 to allow data communication therebetween.

The operator 131 includes various buttons and switches provided at a housing surface of the projector 100, generates an operation signal corresponding to an operation of the buttons and switches, and outputs the operation signal to the input interface 135. The input interface 135 includes a circuit that outputs the operation signal received from the operator 131 to the first controller 150.

The remote controller light receiver 133 receives an infrared signal transmitted from a remote controller 5 and decodes the received infrared signal to generate an operation signal. The remote controller light receiver 133 outputs the generated operation signal to the input interface 135. The input interface 135 includes a circuit that outputs the operation signal received from the remote controller light receiver 133 to the first controller 150.

The storage unit 137 is, for example, a magnetic recording device such as a hard disk drive (HDD), or a storage device using a semiconductor storage element such as a flash memory or a solid state drive (SSD). The storage unit 137 stores a program to be executed by the first controller 150, data processed by the first controller 150, the image data, and the like.

The first communication interface 141 is communication interface for executing communication with the control device 400 according to an Ethernet (registered trademark) standard. The first communication interface 141 includes a connector that couples the Ethernet (registered trademark) cables, and an interface circuit that processes signals transmitted through the connector. The first communication interface 141 is an interface board including the connector and the interface circuit, and is coupled to a main board on which a first processor 150A of the first controller 150, etc. are mounted. Alternatively, the connector and the interface circuit constituting the first communication interface 141 are mounted on a main board of the first controller 150. The first communication interface 141 receives the image data, etc. from the control device 400.

The first controller 150 includes a first memory 150B and the first processor 150A.

The first memory 150B is a storage device that stores a program to be executed by the first processor 150A and data in a non-volatile manner. The first memory 150B is implemented by a magnetic storage device, a semiconductor storage element such as a flash read only memory (ROM), or other types of nonvolatile storage devices. The first memory 150B may include a random access memory (RAM) that constitutes a work area of the first processor 150A. The first memory 150B stores data processed by the first controller 150, a first control program to be executed by the first processor 150A, and the like.

According to an instruction from the control device 400, the first controller 150 performs the contrast correction corresponding to the correction value CV on the projection image PM. The first controller 150 receives the correction value CV from the control device 400.

The contrast correction will be described with reference to FIG. 7.

The first processor 150A may be implemented by a single processor, or a plurality of processors may be provided to function as the first processor 150A. The first processor 150A executes a first control program PG1 to control each part of the projector 100. For example, the first processor 150A outputs an execution instruction of image processing corresponding to an operation accepted by the operator 131 and the remote controller 5 and a parameter used in the image processing to the image processing unit 145. The parameter includes, for example, a geometric correction parameter for correcting a geometric distortion of the image projected on the floor surface FL. In addition, the first processor 150A controls the light source driver 121 to control turning-on and turning-off of the light source unit 111 to adjust an output of the light source unit 111, that is, the light amount.

The first processor 150A may be implemented by a part or all of the first memory 150B and a system on chip (SoC) integrated with another circuit. The first processor 150A may be implemented by a combination of a central processing unit (CPU) that executes a program and a digital signal processor (DSP) that executes predetermined arithmetic processing. All of functions of the first processor 150A may be implemented in hardware or may be implemented by using a programmable device.

The image processing unit 145 and the frame memory 143 can be implemented by, for example, an integrated circuit. The integrated circuit includes a large-scale integration (LSI), an application specific integrated circuit (ASIC), and a programmable logic device (PLD). The PLD includes, for example, a field-programmable gate array (FPGA). A part of a configuration of the integrated circuit may include an analog circuit or a combination of a processor and the integrated circuit. The combination of the processor and the integrated circuit is called a micro controller (MCU), a system-on-a-chip (SoC), a system LSI, a chip set, or the like.

The image processing unit 145 loads the image data received from the first communication interface 141 into the frame memory 143. The frame memory 143 includes a plurality of banks. Each bank has a storage capacity capable of writing image data of one frame thereto. The frame memory 143 is implemented by, for example, a synchronous dynamic random access memory (SDRAM).

The image processing unit 145 performs, for example, image processing such as resolution conversion processing, resizing processing, distortion aberration correction, shape correction processing, digital zoom processing, image hue adjustment, and luminance adjustment on the image data loaded into the frame memory 143.

The image processing unit 145 generates a vertical synchronization signal obtained by converting an input frame frequency of the vertical synchronization signal to a drawing frequency. The generated vertical synchronization signal is referred to as an output synchronization signal. The image processing unit 145 outputs the generated output synchronization signal to the optical modulation device driver 122.

Next, a configuration of the control device 400 will be described with reference to FIG. 6.

Figure 6:
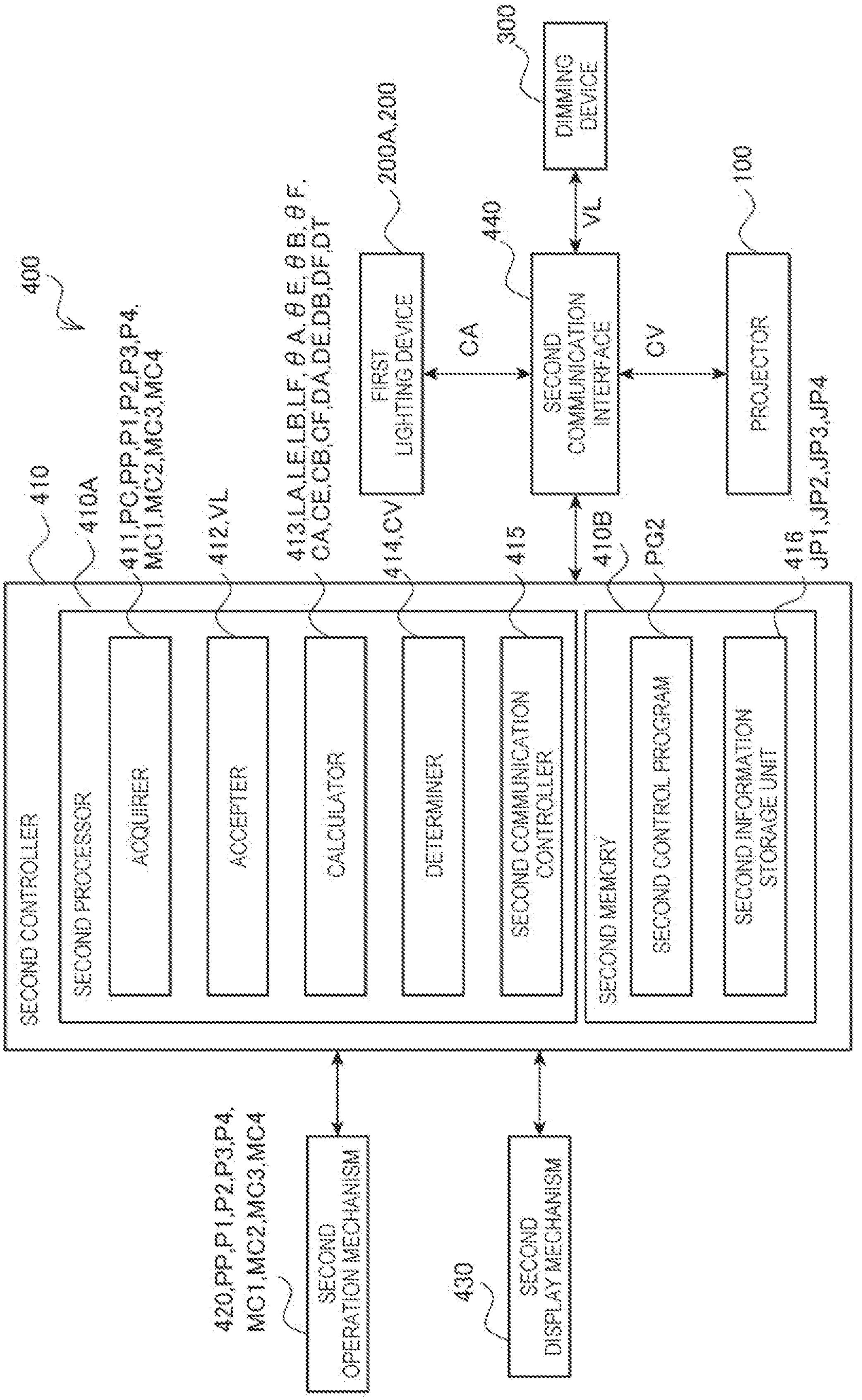
FIG. 6 is a diagram illustrating an example of a configuration of a control device according to the embodiment.

FIG. 6 is a diagram illustrating an example of the configuration of the control device 400 according to the embodiment. As illustrated in FIG. 6, the control device 400 includes a second controller 410, a second operation mechanism 420, a second display mechanism 430, and a second communication interface 440. The second controller 410 includes a second processor 410A and a second memory 410B. The second controller 410 controls operations of parts of the control device 400.

The second operation mechanism 420, the second display mechanism 430, and the second communication interface 440 are coupled to the second controller 410.

The second operation mechanism 420 is coupled to, for example, a mouse or a keyboard, and accepts an operation from the user. The user is, for example, an operator of the control device 400. Then, the second operation mechanism 420 generates an operation signal corresponding to the accepted operation and outputs the generated operation signal to the second controller 410.

The second display mechanism 430 includes a liquid crystal display (LCD), etc. and displays various images on the LCD according to an instruction from the second controller 410.

The second communication interface 440 includes a connector and an interface circuit, and is coupled to the second controller 410. In the embodiment, the second communication interface 440 is, for example, an interface for communicating with the projector 100, the lighting devices 200, and the dimming device 300 according to the Ethernet (registered trademark) standard.

The second processor 410A includes a CPU, a DSP, a microcomputer, and the like. The second processor 410A may be implemented by a plurality of processors or may be implemented by a single processor.

The second processor 410A may be hardware that is programmed to implement functions of the parts to be described later. That is, the second processor 410A may have a configuration in which a second control program PG2 is mounted as a hardware circuit. In this case, for example, the second processor 410A is implemented by an ASIC, an FPGA, and the like.

In the following description, a case will be described in which the second processor 410A executes the second control program PG2 to implement various functions of the second controller 410.

The second processor 410A corresponds to an example of a "processor".

The second memory 410B has a storage area for storing a program to be executed by the second processor 410A and data processed by the second processor 410A. The second memory 410B stores the second control program PG2 to be executed by the second processor 410A, various types of image data and setting data related to operations of the control device 400, and the like.

The second memory 410B has a nonvolatile storage area for storing programs and data in a non-volatile manner. The second memory 410B may include, for example, an ROM, an HDD, or an SSD as the nonvolatile storage area. The second memory 410B may have a volatile storage area, and may form a work area for temporarily storing the program to be executed by the second processor 410A and data to be processed. The second memory 410B may have, for example, an RAM as the volatile storage area.

As illustrated in FIG. 6, the second controller 410 includes an acquirer 411, an accepter 412, a calculator 413, a determiner 414, a second communication controller 415, and a second information storage unit 416. These parts are implemented by, for example, cooperation of software and hardware by the second processor 410A executing the second control program PG2.

The second control program PG2 corresponds to an example of a "program".

In the embodiment, a case will be described in which the control device 400 includes the acquirer 411, the accepter 412, the calculator 413, the determiner 414, the second communication controller 415, and the second information storage unit 416, and the present disclosure is not limited thereto. For example, a server device (not illustrated) may include the acquirer 411, the accepter 412, the calculator 413, the determiner 414, the second communication controller 415, and the second information storage unit 416.

For example, a processor of the server device may function as the acquirer 411, the accepter 412, the calculator 413, the determiner 414, and the second communication controller 415 by executing a control program. Further, when the processor of the server device executes the control program, a memory of the server device may function as the second information storage unit 416. In this case, the server device corresponds to an example of a "control device".

In this case, the control program of the server device corresponds to an example of a "program".

The second information storage unit 416 stores the first position information JP1, the second position information JP2, predetermined position information JPC, and specific position information JPP. The first position information JP1 indicates the first position P1 at which the first lighting device 200A is disposed. The second position information JP2 indicates the second position P2 at which the second lighting device 200E is disposed. The predetermined position information JPC indicates the predetermined position PC that is the position of the floor surface FL onto which the projector 100 projects the projection image PM. The specific position information JPP indicates the specific position PP at which the projector 100 is disposed. The first position information JP1, the second position information JP2, the predetermined position information JPC, and the specific position information JPP are acquired by the acquirer 411 and stored in the second information storage unit 416 by the acquirer 411.

The second information storage unit 416 stores the third position information JP3 and the fourth position information JP4. The third position information JP3 indicates the third position P3 at which the third lighting device 200B is disposed. The fourth position information JP4 indicates the fourth position P4 at which the fourth lighting device 200F is disposed. The third position information JP3 and the fourth position information JP4 are acquired by the acquirer 411 and stored in the second information storage unit 416 by the acquirer 411.

The second information storage unit 416 stores the first maximum light amount MC1 and the second maximum light amount MC2. The first maximum light amount MC1 and the second maximum light amount MC2 are accepted by the accepter 412 and stored in the second information storage unit 416 by the accepter 412.

The second information storage unit 416 stores the third maximum light amount MC3 and the fourth maximum light amount MC4. The third maximum light amount MC3 and the fourth maximum light amount MC4 are accepted by the accepter 412 and stored in the second information storage unit 416 by the accepter 412.

In the embodiment, values of the first maximum light amount MC1, the second maximum light amount MC2, the third maximum light amount MC3, and the fourth maximum light amount MC4 coincide with one another.

The second information storage unit 416 further stores the dimming level VL. The dimming level VL is accepted by the accepter 412 and stored in the second information storage unit 416 by the accepter 412.

The acquirer 411 acquires the first position information JP1, the second position information JP2, the predetermined position information JPC, and the specific position information JPP. The specific position information JPP indicates the specific position PP at which the projector 100 is disposed. The predetermined position information JPC indicates the predetermined position PC that is the position of the floor surface FL onto which the projector 100 projects the projection image PM. The first position information JP1 indicates the first position P1 at which the first lighting device 200A is disposed. The second position information JP2 indicates the second position P2 at which the second lighting device 200E is disposed.

The acquirer 411 further acquires the third position information JP3 and the fourth position information JP4. The third position information JP3 indicates the third position P3 at which the third lighting device 200B is disposed. The fourth position information JP4 indicates the fourth position P4 at which the fourth lighting device 200F is disposed.

As described with reference to FIG. 2, each of the specific position PP, the first position P1, the second position P2, the third position P3, and the fourth position P4 is represented by the X coordinate and the Y coordinate.

For example, the acquirer 411 accepts the operation of the user on the second operation mechanism 420, and acquires the first position information JP1, the second position information JP2, the third position information JP3, the fourth position information JP4, and the specific position information JPP according to the accepted operation. Then, the acquirer 411 causes the second information storage unit 416 to store the first position information JP1, the second position information JP2, the third position information JP3, the fourth position information JP4, and the specific position information JPP.

The accepter 412 accepts the first maximum light amount MC1, the second maximum light amount MC2, the third maximum light amount MC3, and the fourth maximum light amount MC4. The first maximum light amount MC1 indicates the maximum value of the light amount of the first lighting device 200A. In other words, for example, when the dimming level VL is set to "1" by the dimming device 300, the first lighting device 200A outputs a light amount of the first maximum light amount MC1. The second maximum light amount MC2 indicates the maximum value of the light amount of the second lighting device 200E. The third maximum light amount MC3 indicates the maximum value of the light amount of the third lighting device 200B. The fourth maximum light amount MC4 indicates the maximum value of the light amount of the fourth lighting device 200F.

For example, the accepter 412 accepts the operation of the user on the second operation mechanism 420, and accepts the first maximum light amount MC1, the second maximum light amount MC2, the third maximum light amount MC3, and the fourth maximum light amount MC4 according to the accepted operation. The accepter 412 causes the second information storage unit 416 to store the first maximum light amount MC1, the second maximum light amount MC2, the third maximum light amount MC3, and the fourth maximum light amount MC4.

The accepter 412 accepts the dimming level VL from the dimming device 300. For example, the accepter 412 accepts the dimming level VL from the dimming device 300 by communicating with the dimming device 300.

The accepter 412 accepts a first priority PR1 as a priority for the first group GR1 and a second priority PR2 as a priority for the second group GR2.

For example, when the second priority PR2 is higher than the first priority PR1, the calculator 413 sets the light amount of the lighting device 200 provided in the second group GR2 to be larger than the light amount of the lighting device 200 provided in the first group GR1.

The calculator 413 calculates the first distance LA and the first incident angle θA based on the first position P1 and the predetermined position PC. As illustrated in FIG. 4, the first distance LA is a distance between the first position P1 and the predetermined position PC. As illustrated in FIG. 4, the first incident angle θA is the angle at which the light emitted from the first lighting device 200A is incident on the predetermined position PC.

The calculator 413 calculates the second distance LE and the second incident angle θE based on the second position P2 and the predetermined position PC. As illustrated in FIG. 4, the second distance LE is a distance between the second position P2 and the predetermined position PC. As illustrated in FIG. 4, the second incident angle θE is the angle at which the light emitted from the second lighting device 200E is incident on the predetermined position PC.

The calculator 413 calculates a first light amount CA based on the first maximum light amount MC1 and the dimming level VL. The first light amount CA is the light amount of the first lighting device 200A. The first light amount CA is calculated by the following equation (1).

$$CA = MC1 \times F1(VL) \quad (1)$$

A first function F1(VL) is a function of the dimming level VL. The first function F1(VL) is a function for determining the light amount of the lighting device 200 provided in the first group GR1.

The calculator 413 calculates a second light amount CE based on the second maximum light amount MC2 and the dimming level VL. The second light amount CE is the light amount of the second lighting device 200E. The second light amount CE is calculated by the following equation (2).

$$CE = MC2 \times F2(VL) \quad (2)$$

A second function F2(VL) is a function of the dimming level VL. The second function F2(VL) is a function for determining the light amount of the lighting device 200 provided in the second group GR2.

In the embodiment, the first function F1(VL) and the second function F2(VL) are functions proportional to the dimming level VL.

The calculator 413 calculates a third light amount CB based on the third maximum light amount MC3 and the dimming level VL. The third light amount CB is the light amount of the third lighting device 200B. The third light amount CB is calculated by the following equation (3).

$$CB = MC3 \times F1(VL) \quad (3)$$

The calculator 413 calculates a fourth light amount CF based on the fourth maximum light amount MC4 and the dimming level VL. The fourth light amount CF is the light amount of the fourth lighting device 200F. The fourth light amount CF is calculated by the following equation (4).

$$CF = MC4 \times F2(VL) \quad (4)$$

When the second priority PR2 is higher than the first priority PR1, the calculator 413 sets the light amount of the lighting device 200 provided in the second group GR2 to be larger than the light amount of the lighting device 200 provided in the first group GR1. In other words, the calculator 413 sets the first function F1(VL) and the second function F2(VL) such that the light amount of the lighting device 200 provided in the second group GR2 is larger than the light amount of the lighting device 200 provided in the first group GR1.

The calculator 413 calculates a first influence degree DA based on the first distance LA, the first incident angle θA, and the first light amount CA. The first influence degree DA indicates a degree of influence of the light emitted from the first lighting device 200A on visibility of the projection image PM projected onto the predetermined position PC. The first influence degree DA is calculated by the following equation (5).

$$DA = CA \times \mathrm{COS}(\theta A) \times FH(\theta A)/LA^2 \quad (5)$$

Here, a light distribution function FH(OA) indicates the light distribution characteristic of the lighting device 200 illustrated in FIG. 3. The first distance LA and the first incident angle θA are calculated based on the position of the first lighting device 200A and a distance LP between the ceiling CL and the floor surface FL. Therefore, [$\mathrm{COS}(\theta A) \times \mathrm{FH}(\theta A)/LA^2$] on a right side of Equation (5) is a constant.

In other words, the first influence degree DA is a function proportional to the first light amount CA.

The calculator 413 calculates a second influence degree DE based on the second distance LE, the second incident angle θE, and the second light amount CE. The second influence degree DE indicates a degree of influence of the light emitted from the second lighting device 200E on the visibility of the projection image PM projected onto the predetermined position PC. The second influence degree DE is calculated by the following equation (6).

$$DE = CE \times \mathrm{COS}(\theta E) \times FH(\theta E)/LE^2 \quad (6)$$

Here, a light distribution function FH(θE) indicates the light t distribution characteristic of the lighting device 200 illustrated in FIG. 3. The second distance LE and the second incident angle θE are calculated based on the position of the second lighting device 200E and the distance LP between the ceiling CL and the floor surface FL. Therefore, [$\mathrm{COS}(\theta E) \times \mathrm{FH}(\theta E)/LE^2$] on a right side of Equation (6) is a constant.

In other words, the second influence degree DE is a function proportional to the second light amount CE.

The calculator 413 calculates a lighting influence degree DT based on the first influence degree DA and the second influence degree DE. The lighting influence degree DT indicates a degree of influence of the light emitted from the first lighting device 200A and the light emitted from the second lighting device 200E on the visibility of the projection image PM projected onto the predetermined position PC. The lighting influence degree DT is obtained by the following equation (7).

$$DT = DA \times \alpha + DE + \beta \tag{7}$$

A coefficient α and a coefficient β are weights determined based on the number of the lighting devices 200. Each of the coefficient α and the coefficient β is determined as follows.

In the embodiment, as described with reference to FIG. 2, the lighting devices 200 include the four lighting devices 200 constituting the first group GR1 and the eight lighting devices 200 constituting the second group GR2. Each of the four lighting devices 200 constituting the first group GR1 affects the visibility of the projection image PM by the same influence as the light emitted from the first lighting device 200A. Each of the eight lighting devices 200 constituting the second group GR2 affects the visibility of the projection image PM by the same influence as the light emitted from the second lighting device 200E.

Therefore, in the embodiment, the lighting influence degree DT of the twelve lighting devices 200 is obtained by the following equation (8).

$$DT = DA \times 4 + DE \times 8 \tag{8}$$

That is, Equation (8) can be expressed as the following equation (9).

$$DT = DG1 + DG2 \tag{9}$$

Here, a first group influence degree DG1 indicates a degree of influence of lights emitted from the four lighting devices 200 constituting the first group GR1 on the visibility of the projection image PM projected onto the predetermined position PC. A second group influence degree DG2 indicates a degree of influence of lights emitted from the eight lighting devices 200 constituting the second group GR2 on the visibility of the projection image PM projected onto the predetermined position PC.

Figure 9:
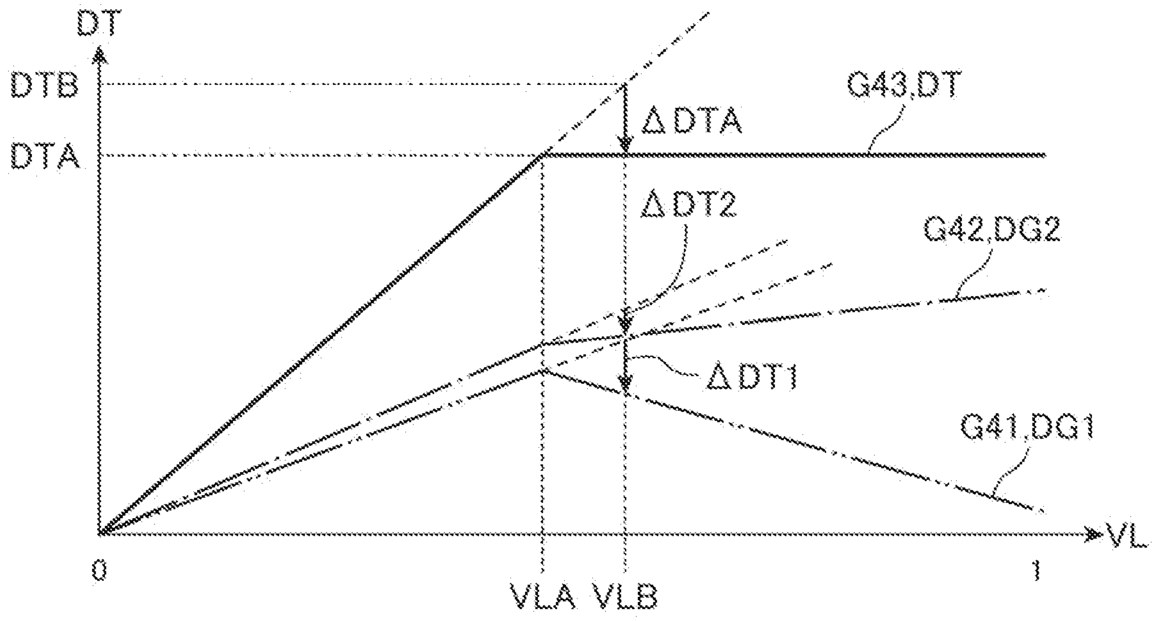
FIG. 9 is a graph illustrating an example of a correlation between a dimming level and the lighting influence degree.

The first group influence degree DG1 and the second group influence degree DG2 will be further described with reference to FIG. 9.

The determiner 414 determines the correction value CV indicating the degree of the contrast correction of the projector 100 based on the first position information JP1, the second position information JP2, the predetermined position information JPC, the first maximum light amount MC1, the second maximum light amount MC2, and the dimming level VL.

For example, the determiner 414 determines the correction value CV based on the first influence degree DA and the second influence degree DE.

In addition, for example, the determiner 414 determines the correction value CV based on the lighting influence degree DT.

As described with reference to FIGS. 8 and 9, when the lighting influence degree DT calculated by the calculator 413 is larger than a maximum influence degree DTA, the determiner 414 reduces the first influence degree DA and the second influence degree DE such that the lighting influence degree DT is the maximum influence degree DTA. The maximum influence degree DTA is an upper limit value of the lighting influence degree DT. The maximum influence degree DTA corresponds to a maximum correction value CVM. The maximum correction value CVM is an upper limit value of the correction value CV. When the correction value CV is larger than the maximum correction value CVM, the projection image PM cannot be corrected appropriately. In other words, when the lighting influence degree DT is larger than the maximum influence degree DTA, the determiner 414 reduces the first light amount CA and the second light amount CE such that the lighting influence degree DT is the maximum influence degree DTA.

The determiner 414 transmits the correction value CV to the projector 100, and causes the projector 100 to execute the contrast correction corresponding to the correction value CV.

Here, a method for determining the correction value CV will be described. As for the correction value CV, the most appropriate correction value CV is determined based on a subjective evaluation by an evaluator.

For example, when the correction value CV is determined based on the first influence degree DA and the second influence degree DE, the most appropriate correction value CV is determined based on the subjective evaluation by the evaluator according to a combination of values of the first influence degree DA and the second influence degree DE.

The determiner 414 transmits the first light amount CA to the four lighting devices 200 constituting the first group GR1 and causes each of the four lighting devices 200 to output the first light amount CA. The determiner 414 transmits the second light amount CE to the eight lighting devices 200 constituting the second group GR2 and causes each of the eight lighting devices 200 to output the second light amount CE.

A method of the contrast correction of the projector 100 will be described with reference to FIG. 7.

The second communication controller 415 receives the dimming level VL from the dimming device 300.

The second communication controller 415 transmits the correction value CV to the projector 100. The second communication controller 415 transmits the first light amount CA to the four lighting devices 200 constituting the first group GR1. The second communication controller 415 transmits the second light amount CE to the eight lighting devices 200 constituting the second group GR2.

Next, the contrast correction of the projector 100 will be described with reference to FIG. 7. FIG. 7 is a graph illustrating an example of the contrast correction. A horizontal axis of FIG. 7 represents a luminance value Yin of an input image PI, and a vertical axis of FIG. 7 represents a luminance value Yout of the projection image PM. The input image PI corresponds to the projection image PM before the contrast correction is performed. Each of the luminance value Yin and the luminance value Yout has, for example, a minimum value of "0" and a maximum value of "1024".

The luminance value Yin is a luminance value of pixels constituting the input image PI, and the luminance value Yout is a luminance value of pixels constituting the projection image PM.

Figure 7:
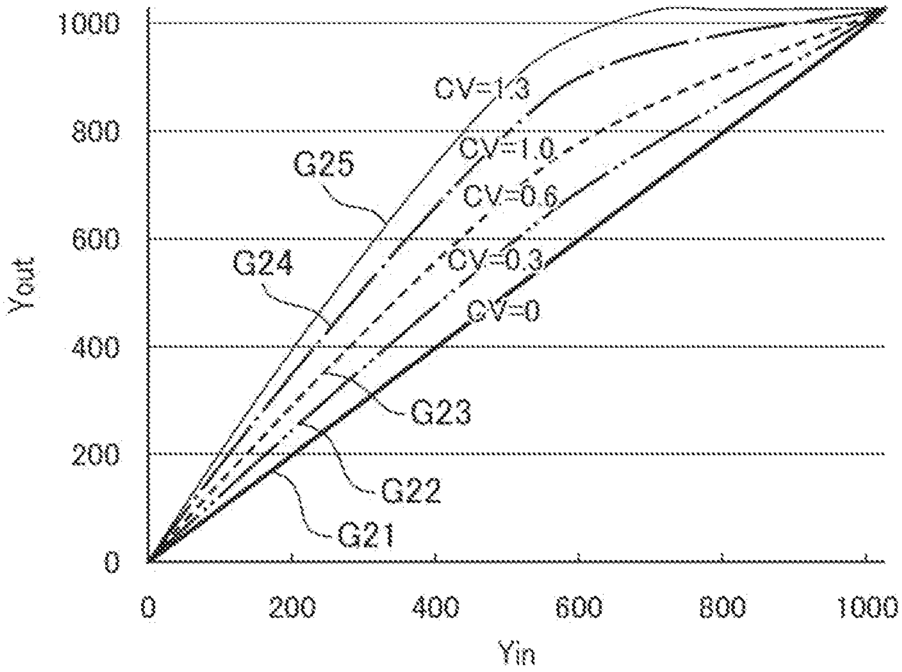
FIG. 7 is a graph illustrating an example of contrast correction.

As illustrated in FIG. 7, when the correction value CV of the contrast correction is "0", the luminance value Yout coincides with the luminance value Yin as illustrated in a graph G21.

In the embodiment, the contrast correction is, for example, correction for increasing the luminance value of the input image PI mainly in a low luminance to a medium luminance.

As illustrated in FIG. 7, as the correction value CV of the contrast correction increases, the luminance value Yout of the pixels corresponding to the luminance value Yin increases as illustrated in graphs G22 to G25. The graph G22 illustrates a correlation between the luminance value Yin of the input image PI and the luminance value Yout of the projection image PM when the correction value CV is "0.3". The graph G23 illustrates a correlation between the luminance value Yin of the input image PI and the luminance value Yout of the projection image PM when the correction value CV is "0.6". The graph G24 illustrates a correlation between the luminance value Yin of the input image PI and the luminance value Yout of the projection image PM when the correction value CV is "1.0". The graph G25 illustrates a correlation between the luminance value Yin of the input image PI and the luminance value Yout of the projection image PM when the correction value CV is "1.3".

In the embodiment, the maximum correction value CVM, which is the maximum value of the correction value CV, is, for example, "1.0". When the correction value CV is "1.3", which is larger than the maximum correction value CVM, as illustrated in the graph G25 of FIG. 7, the luminance value Yout of the pixels constituting the projection image PM is saturated at "1024" when the luminance value Yin of the pixels constituting the input image PI is "700" or more. Accordingly, when the correction value CV is "1.3", all pixels whose luminance value Yin is "700" or more among the pixels constituting the input image PI have the luminance value Yout of "1024" in the projection image PM, and therefore a part of the projection image PM does not correspond to the input image PI. Therefore, "1.3" cannot be used as the correction value CV.

As illustrated in FIG. 7, the projector 100 performs the correction such that the luminance value Yout of the pixel corresponding to the luminance value Yin increases as the correction value CV increases. Accordingly, by increasing the correction value CV, the projector 100 can display the projection image PM which is hardly affected by the lighting light from the lighting device 200 on the floor surface FL.

Next, a correlation between the lighting influence degree DT and the correction value CV of the contrast correction will be described with reference to FIG. 8. FIG. 8 is a graph illustrating an example of the correlation between the lighting influence degree DT and the correction value CV of the contrast correction. A horizontal axis of FIG. 8 represents the lighting influence degree DT, and a vertical axis of FIG. 8 represents the correction value CV.

Figure 8:
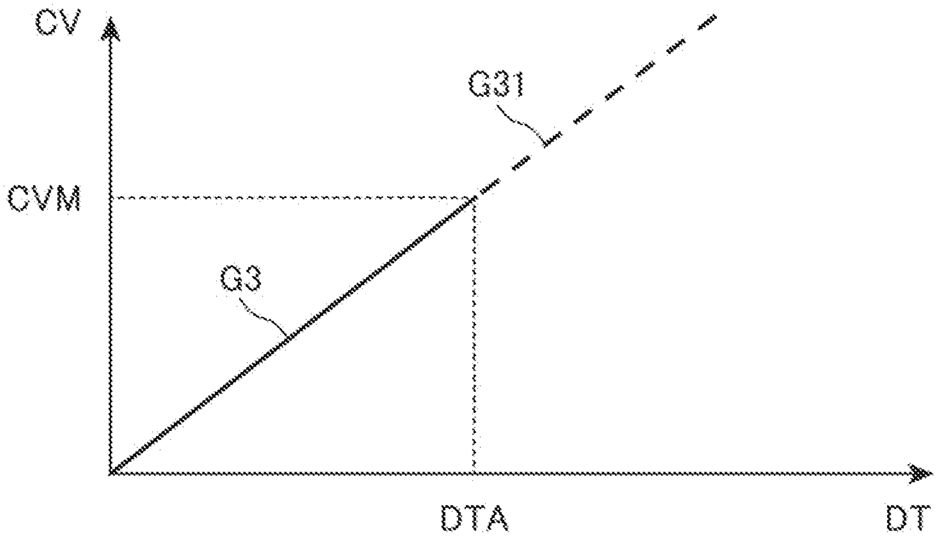
FIG. 8 is a graph illustrating an example of a correlation between a lighting influence degree and a correction value of the contrast correction.

As illustrated in a graph G3 of FIG. 8, in the embodiment, the correction value CV is proportional to, for example, the lighting influence degree DT. The maximum correction value CVM corresponds to the maximum influence degree DTA. The maximum correction value CVM is the maximum value of the correction value CV of the contrast correction. The maximum correction value CVM is, for example, "1.0". The maximum influence degree DTA is a maximum value of the lighting influence degree DT.

As described with reference to FIG. 6, when the correction value CV determined by the determiner 414 based on the first position information JP1, the second position the first maximum light amount MC1, the second maximum light amount MC2, and the dimming level VL is larger than the maximum correction value CVM, the determiner 414 executes the following processing.

That is, the determiner 414 reduces the lighting influence degree DT such that the correction value CV coincides with the maximum correction value CVM. Specifically, the determiner 414 adjusts the first light amount CA and the second light amount CE such that the correction value CV coincides with the maximum correction value CVM. The first light amount CA is a light amount output by each of the four lighting devices 200 constituting the first group GR1. The second light amount CE is a light amount output by each of the eight lighting devices 200 constituting the second group GR2.

As described above, since the determiner 414 determines the correction value CV to be equal to or less than the maximum correction value CVM, the determiner 414 determines that the correction value CV is not larger than the maximum correction value CVM. Therefore, the graph G3 corresponding to the correction value CV larger than the maximum correction value CVM is indicated by a broken line as illustrated in a graph G31.

Next, a correlation between the dimming level VL and the lighting influence degree DT will be described with reference to FIG. 9. FIG. 9 is a graph illustrating an example of the correlation between the dimming level VL and the lighting influence degree DT. A horizontal axis of FIG. 9 represents the dimming level VL, and a vertical axis of FIG. 9 represents the lighting influence degree DT.

A graph G41 illustrates a correlation between the first group influence degree DG1 and the dimming level VL. A graph G42 illustrates a correlation between the second group influence degree DG2 and the dimming level VL. A graph G43 illustrates a correlation between the lighting influence degree DT and the dimming level VL.

The first group influence degree DG1 indicates the degree of influence of the lights emitted from the four lighting devices 200 constituting the first group GR1 on the visibility of the projection image PM projected onto the predetermined position PC. The second group influence degree DG2 indicates the degree of influence of the lights emitted from the eight lighting devices 200 constituting the second group GR2 on the visibility of the projection image PM projected onto the predetermined position PC. The lighting influence degree DT indicates the degree of influence of the light emitted from the lighting device 200 on the visibility of the projection image PM projected onto the predetermined position PC.

As described by using Equation (9) with reference to FIG. 6, the lighting influence degree DT is a sum of the first group influence degree DG1 and the second group influence degree DG2.

When the dimming level VL is less than or equal to a specific dimming level VLA, the first group influence degree DG1 is proportional to the dimming level VL as illustrated in the graph G41. When the dimming level VL is less than or equal to the specific dimming level VLA, the second group influence degree DG2 is proportional to the dimming level VL as illustrated in the graph G42. As a result, when the dimming level VL is less than or equal to the specific dimming level VLA, the lighting influence degree DT is proportional to the dimming level VL as illustrated in the graph G43.

In other words, as described with reference to FIG. 6, when the calculator 413 calculates the first influence degree DA and the second influence degree DE and calculates the lighting influence degree DT based on the first influence degree DA and the second influence degree DE, the lighting influence degree DT is proportional to the dimming level VL.

The specific dimming level VLA corresponds to the maximum influence degree DTA. That is, when the dimming level VL is the specific dimming level VLA, the lighting influence degree DT coincides with the maximum influence degree DTA.

Further, as described with reference to FIG. 6, when the lighting influence degree DT calculated by the calculator 413 is larger than the maximum influence degree DTA, the determiner 414 reduces the first influence degree DA and the second influence degree DE such that the lighting influence degree DT is the maximum influence degree DTA. In other words, when the lighting influence degree DT calculated by the calculator 413 is larger than the maximum influence degree DTA, the determiner 414 reduces the first group influence degree DG1 and the second group influence degree DG2 such that the lighting influence degree DT is the maximum influence degree DTA.

For example, when the dimming level VL is a dimming level VLB larger than the specific dimming level VLA, the lighting influence degree DT calculated by the calculator 413 is a lighting influence degree DTB larger than the maximum influence degree DTA.

In this case, as illustrated in the graph G41, the determiner 414 reduces the first group influence degree DG1 by a first adjustment amount ΔDT1. In other words, the determiner 414 reduces the first light amount CA of the lighting device 200 provided in the first group GR1 to reduce the first group influence degree DG1 by the first adjustment amount ΔDT1.

Further, as illustrated in the graph G42, the determiner 414 reduces the second group influence degree DG2 by a second adjustment amount ΔDT2. In other words, the determiner 414 reduces the second light amount CE of the lighting device 200 provided in the second group GR2 to reduce the second group influence degree DG2 by the second adjustment amount ΔDT2.

As a result, as illustrated in the graph G43, when the dimming level VL is the dimming level VLB, the determiner 414 can cause the lighting influence degree DT to coincide with the maximum influence degree DTA by reduce the lighting influence degree DT by a total adjustment amount ΔDTA.

Figure 10:
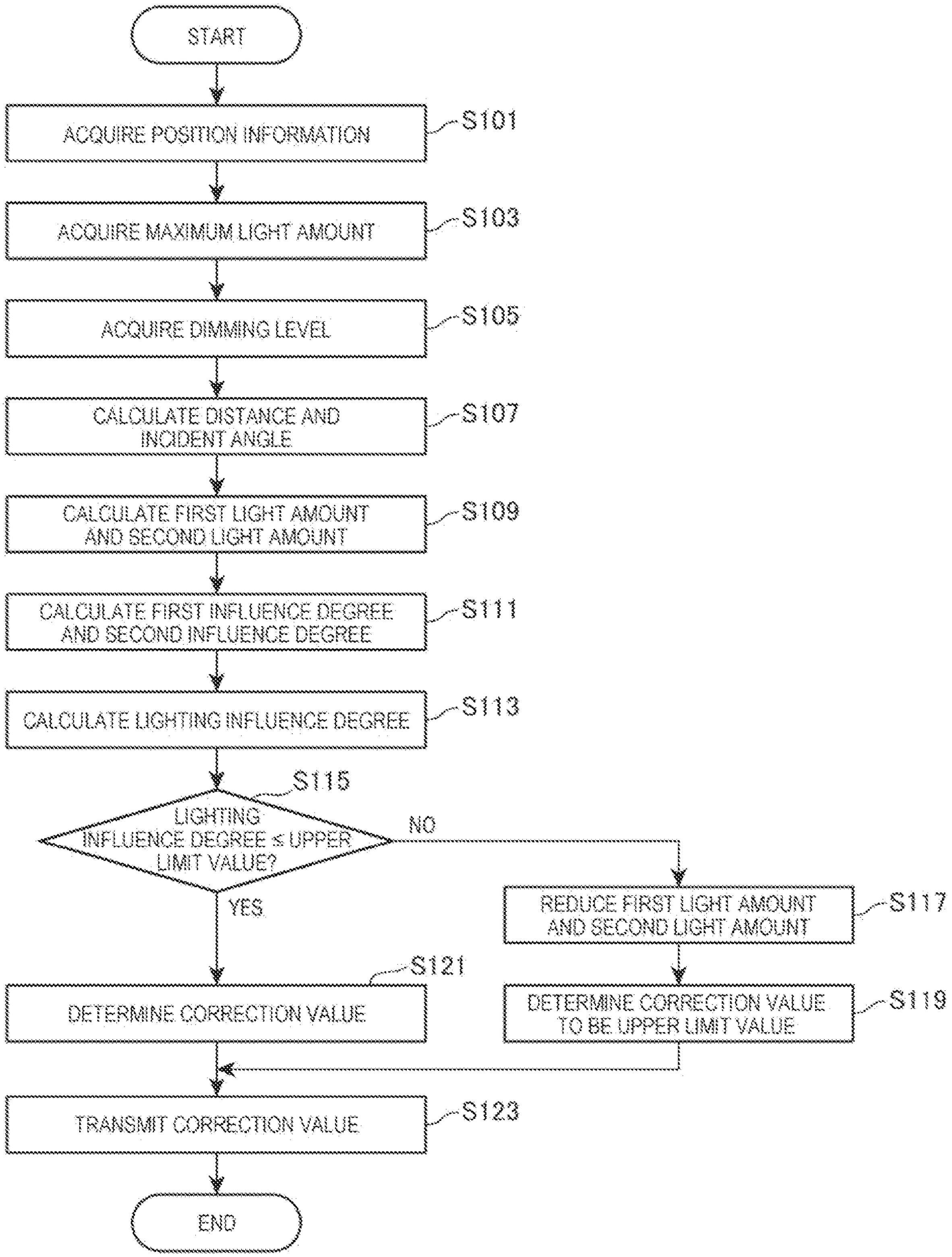
FIG. 10 is a flowchart illustrating an example of processing of the control device.

Next, processing of the second controller 410 of the control device 400 will be described with reference to FIG. 10. FIG. 10 is a flowchart illustrating an example of the processing of the second controller 410 of the control device 400.

As illustrated in FIG. 10, first, in step S101, the acquirer 411 acquires position information JP. The position information JP includes the first position information JP1, the second position information JP2, and the specific position information JPP. The first position information JP1 indicates the first position P1 at which the first lighting device 200A is disposed. The second position information JP2 indicates the second position P2 at which the second lighting device 200E is disposed. The specific position information JPP indicates the specific position PP at which the projector 100 is disposed.

Next, in step S103, the accepter 412 accepts a maximum light amount MC. The maximum light amount MC includes the first maximum light amount MC1 and the second maximum light amount MC2. The first maximum light amount MC1 indicates the maximum value of the light amount of the first lighting device 200A. The second maximum light amount MC2 indicates the maximum value of the light amount of the second lighting device 200E.

Next, in step S105, the accepter 412 accepts the dimming level VL from the dimming device 300.

Next, in step S107, the calculator 413 calculates a distance L and an incident angle θ. The distance L includes the first distance LA and the second distance LE. The incident angle θ includes the first incident angle θA and the second incident angle θE. The first distance LA is the distance between the first position P1 and the predetermined position PC. The second distance LE is the distance between the second position P2 and the predetermined position PC. The first incident angle θA is the angle at which the light emitted from the first lighting device 200A is incident on the predetermined position PC. The second incident angle θE is the angle at which the light emitted from the second lighting device 200E is incident on the predetermined position PC.

Next, in step S109, the calculator 413 calculates the first light amount CA and the second light amount CE. The first light amount CA is the light amount of the first lighting device 200A. The second light amount CE is the light amount of the second lighting device 200E.

Next, in step S111, the calculator 413 calculates the first influence degree DA and the second influence degree DE. The first influence degree DA indicates the degree of influence of the light emitted from the first lighting device 200A on the visibility of the projection image PM projected onto the predetermined position PC. The second influence degree DE indicates the degree of influence of the light emitted from the second lighting device 200E on the visibility of the projection image PM projected onto the predetermined position PC.

Next, in step S113, the calculator 413 calculates the lighting influence degree DT. The lighting influence degree DT indicates the degree of influence of the light emitted from the lighting device 200 on the visibility of the projection image PM projected onto the predetermined position PC. The lighting devices 200 include, for example, the four lighting devices 200 constituting the first group GR1 and the eight lighting devices 200 constituting the second group GR2. The first lighting device 200A and the third lighting device 200B are provided in the first group GR1. The second lighting device 200E and the fourth lighting device 200F are provided in the second group GR2.

Next, in step S115, the determiner 414 determines whether the lighting influence degree DT is equal to or less than the maximum influence degree DTA which is the upper limit value of the lighting influence degree DT.

When the determiner 414 determines that the lighting influence degree DT is equal to or less than the maximum influence degree DTA (YES in step S115), the processing proceeds to step S121. When the determiner 414 determines that the lighting influence degree DT is larger than the maximum influence degree DTA (NO in step S115), the processing proceeds to step S117.

Then, in step S117, the determiner 414 reduces the first light amount CA and the second light amount CE such that the lighting influence degree DT coincides with the maximum influence degree DTA.

Next, in step S119, the determiner 414 determines the correction value CV to be the maximum correction value CVM which is the upper limit value of the correction value CV. Thereafter, the processing proceeds to step S123.

When it is determined as YES in step S115, the determiner 414 determines the correction value CV based on the lighting influence degree DT in step S121. The correction value CV indicates the degree of the contrast correction of the projector 100.

Next, in step S123, the determiner 414 transmits the correction value CV to the projector 100, and causes the projector 100 to execute the contrast correction corresponding to the correction value CV. Thereafter, the processing ends.

Embodiment and Operation Effects

As described above with reference to FIGS. 1 to 10, the display system 1 according to the embodiment includes the first lighting device 200A disposed at the first position P1 of the ceiling CL, the second lighting device 200E disposed at the second position P2 of the ceiling CL different from the first position P1, the projector 100 disposed at the specific position PP of the ceiling CL different from the first position P1 and the second position P2 and configured to project the projection image PM onto the predetermined position PC of the floor surface FL on which a part of the light from at least the first lighting device 200A is incident, and the control device 400 configured to control the first lighting device 200A, the second lighting device 200E, and the projector 100. The control device 400 executes operations including acquiring the first position information JP1 indicating the first position P1, the second position information JP2 indicating the second position P2, and the predetermined position information JPC indicating the predetermined position PC, accepting the first maximum light amount MC1 indicating the maximum value of the light amount of the first lighting device 200A and the second maximum light amount MC2 indicating the maximum value of the light amount of the second lighting device 200E, accepting the dimming level VL for adjusting the light amount of the first lighting device 200A and the light amount of the second lighting device 200E, and determining the correction value CV indicating the degree of the contrast correction of the projector 100 based on the first position information JP1, the second position information JP2, the predetermined position information JPC, the first maximum light amount MC1, the second maximum light amount MC2, and the dimming level VL.

That is, the correction value CV indicating the degree of the contrast correction of the projector 100 is determined based on the first position information JP1, the second position information JP2, the predetermined position information JPC, the first maximum light amount MC1, the second maximum light amount MC2, and the dimming level VL.

Accordingly, the appropriate correction value CV can be determined. Therefore, it is possible to improve the visibility of the projection image PM of the projector 100 while ensuring brightness of the first lighting device 200A and the second lighting device 200E.

In the display system 1, the control device 400 further executes operations including calculating, based on the first position information JP1 and the predetermined position information JPC, the first distance LA that is the distance between the first position P1 and the predetermined position PC and the first incident angle θA that is the angle at which the light emitted from the first lighting device 200A is incident on the predetermined position PC, calculating, based on the second position information JP2 and the predetermined position information JPC, the second distance LE that is the distance between the second position P2 and the predetermined position PC and the second incident angle θE that is the angle at which the light emitted from the second lighting device 200E is incident on the predetermined position PC, calculating the first light amount CA that is the light amount of the first lighting device 200A based on the first maximum light amount MC1 and the dimming level VL, calculating the second light amount CE that is the light amount of the second lighting device 200E based on the second maximum light amount MC2 and the dimming level VL, calculating, based on the first distance LA, the first incident angle θA, and the first light amount CA, the first influence degree DA indicating the degree of influence of the light emitted from the first lighting device 200A on the visibility of the projection image PM projected onto the predetermined position PC; and calculating, based on the second distance LE, the second incident angle θE, and the second light amount CE, the second influence degree DE indicating the degree of influence of the light emitted from the second lighting device 200E on the visibility of the projection image PM projected onto the predetermined position PC. The determining of the correction value CV includes determining the correction value CV based on the first influence degree DA and the second influence degree DE.

Accordingly, since the correction value CV is determined based on the first influence degree DA and the second influence degree DE, the appropriate correction value CV can be determined. Therefore, it is possible to improve the visibility of the projection image PM of the projector 100 while ensuring the brightness of the first lighting device 200A and the second lighting device 200E.

In the display system 1, the determining of the correction value CV includes calculating, based on the first influence degree DA and the second influence degree DE, the lighting influence degree DT indicating the degree of influence of the light emitted from the first lighting device 200A and the light emitted from the second lighting device 200E on the visibility of the projection image PM projected onto the predetermined position PC, and determining the correction value CV based on the lighting influence degree DT.

Accordingly, since the correction value CV is determined based on the lighting influence degree DT, the appropriate correction value CV can be determined. Therefore, it is possible to improve the visibility of the projection image PM of the projector 100 while ensuring the brightness of the first lighting device 200A and the second lighting device 200E.

In the display system 1, the lighting influence degree DT has the maximum influence degree DTA as an upper limit value, and the control device 400 further executes operations including reducing at least one of the first light amount CA and the second light amount CE such that the lighting influence degree DT is equal to or less than the maximum influence degree DTA when the lighting influence degree DT is larger than the maximum influence degree DTA.

Accordingly, since at least one of the first light amount CA and the second light amount CE is reduced such that the lighting influence degree DT is equal to or less than the maximum influence degree DTA, the brightness of the first lighting device 200A and the second lighting device 200E can be appropriately controlled. Therefore, it is possible to improve the visibility of the projection image PM of the projector 100 while ensuring the brightness of the first lighting device 200A and the second lighting device 200E.

In the display system 1, when the second distance LE is larger than the first distance LA and the second incident angle θE is smaller than the first incident angle θA, the control device 400 sets the lighting influence degree DT to the maximum influence degree DTA or less by reducing at least the first light amount CA.

That is, when the second distance LE is larger than the first distance LA and the second incident angle θE is smaller than the first incident angle θA, the first influence degree DA is larger than the second influence degree DE. Accordingly, by setting the lighting influence degree DT to the maximum influence degree DTA or less by reducing at least the first light amount CA, the brightness of the first lighting device 200A and the second lighting device 200E can be appropriately controlled. Therefore, it is possible to improve the visibility of the projection image PM of the projector 100 while ensuring the brightness of the first lighting device 200A and the second lighting device 200E.

The display system 1 further includes the third lighting device 200B disposed at the third position P3 different from the first position P1 and the second position P2, in which when a third distance LB that is a distance between the third position P3 and the predetermined position PC substantially coincides with the first distance LA, the third incident angle θB that is the angle at which the light emitted from the third lighting device 200B is incident on the predetermined position PC substantially coincides with the first incident angle θA, and the third maximum light amount MC3 indicating the maximum value of the light amount of the third lighting device 200B substantially coincides with the first maximum light amount MC1, the control device 400 further executes operations including: setting the first lighting device 200A and the third lighting device 200B as the first group GR1, and performing control such that the third light amount CB that is the light amount of the third lighting device 200B coincides with the first light amount CA.

That is, when the first lighting device 200A and the third lighting device 200B are provided in the first group GR1, the third light amount CB is controlled to coincide with the first light amount CA. Therefore, brightness of the third lighting device 200B can be easily and appropriately controlled.

The display system 1 further includes the fourth lighting device 200F disposed at the fourth position P4 different from the first position P1, the second position P2, and the third position P3, in which when a fourth distance LF that is a distance between the fourth position P4 and the predetermined position PC substantially coincides with the second distance LE, the fourth incident angle θF that is the angle at which the light emitted from the fourth lighting device 200F is incident on the predetermined position PC substantially coincides with the second incident angle θE, and the fourth maximum light amount MC4 indicating the maximum value of the light amount of the fourth lighting device 200F substantially coincides with the second maximum light amount MC2, the control device 400 further executes operations including setting the second lighting device 200E and the fourth lighting device 200F as the second group GR2 different from the first group GR1, and performing control such that the fourth light amount CF that is the light amount of the fourth lighting device 200F coincides with the second light amount CE.

That is, when the second lighting device 200E and the fourth lighting device 200F are provided in the second group GR2, the fourth light amount CF is controlled to coincide with the second light amount CE. Therefore, brightness of the fourth lighting device 200F can be easily and appropriately controlled.

In the display system 1, the control device 400 further executes operations including accepting the first priority PR1 that is the priority for the first group GR1 and the second priority PR2 that is the priority for the second group GR2, and setting the light amount of the lighting device 200 provided in the second group GR2 to be larger than the light amount of the lighting device 200 provided in the first group GR1 when the second priority PR2 is higher than the first priority PR1.

That is, when the second priority PR2 is higher than the first priority PR1, the light amount of the lighting device 200 provided in the second group GR2 is set to be larger than the light amount of the lighting device 200 provided in the first group GR1. Therefore, by appropriately setting the first priority PR1 and the second priority PR2, the light amount of the lighting device 200 provided in the first group GR1 and the light amount of the lighting device 200 provided in the second group GR2 can be appropriately controlled.

The second control program PG2 according to the embodiment is the second control program PG2 for controlling the first lighting device 200A disposed at the first position P1 of the ceiling CL, the second lighting device 200E disposed at the second position P2 of the ceiling CL different from the first position P1, and the projector 100 disposed at the specific position PP of the ceiling CL different from the first position P1 and the second position P2 and configured to project the projection image PM onto the predetermined position PC of the floor surface FL on which a part of the light from at least the first lighting device 200A is incident, and causes the second processor 410A to execute operations including acquiring the first position information JP1 indicating the first position P1, the second position information JP2 indicating the second position P2, and the predetermined position information JPC indicating the predetermined position PC, accepting the first maximum light amount MC1 indicating the maximum value of the light amount of the first lighting device 200A and the second maximum light amount MC2 indicating the maximum value of the light amount of the second lighting device 200E, accepting the dimming level VL for adjusting the light amount of the first lighting device 200A and the light amount of the second lighting device 200E, and determining the correction value CV indicating the degree of the contrast correction of the projector 100 based on the first position information JP1, the second position information JP2, the predetermined position information JPC, the first maximum light amount MC1, the second maximum light amount MC2, and the dimming level VL.

Therefore, the second control program PG2 according to the embodiment can achieve the same effects as those of the display system 1 according to the embodiment.

The control device 400 according to the embodiment is the control device 400 for controlling the first lighting device 200A disposed at the first position P1 of the ceiling CL, the second lighting device 200E disposed at the second position P2 of the ceiling CL different from the first position P1, and the projector 100 disposed at the specific position PP of the ceiling CL different from the first position P1 and the second position P2 and configured to project the projection image PM onto the predetermined position PC of the floor surface FL on which a part of the light from at least the first lighting device 200A is incident, and includes the second processor 410A, in which the second processor 410A executes operations including acquiring the first position information JP1 indicating the first position P1, the second position information JP2 indicating the second position P2, and the predetermined position information JPC indicating the predetermined position PC, accepting the first maximum light amount MC1 indicating the maximum value of the light amount of the first lighting device 200A and the second maximum light amount MC2 indicating the maximum value of the light amount of the second lighting device 200E, accepting the dimming level VL for adjusting the light amount of the first lighting device 200A and the light amount of the second lighting device 200E, and determining the correction value CV indicating the degree of the contrast correction of the projector 100 based on the first position information JP1, the second position the first maximum light amount MC1, the second maximum light amount MC2, and the dimming level VL.

Therefore, the control device 400 according to the embodiment can achieve the same effects as those of the display system 1 according to the embodiment.

Other Embodiments

The above-described embodiment is a preferred embodiment. However, the present disclosure is not limited to the above-described embodiment, and various modifications can be made without departing from the gist of the present disclosure.

In the embodiment, a case is described in which the control device 400 is implemented by a personal computer, and the present disclosure is not limited thereto. The control device 400 may be implemented by, for example, a tablet terminal, or a smartphone. Further, the control device 400 may be, for example, a server device.

In the embodiment, a case is described in which the projector 100 projects the projection image PM onto the floor surface FL, and the present disclosure is not limited thereto. For example, the projector 100 may project the projection image PM onto a wall surface.

In the embodiment, a case is described in which the projector 100 performs the contrast correction by correcting a luminance of the projection image PM, and the present disclosure is not limited thereto. For example, the contrast correction may be performed by the projector 100 performing edge enhancement processing on the projection image PM.

In the embodiment, a case is described in which the first group GR1 includes the four lighting devices 200, and the present disclosure is not limited thereto. The first group GR1 may include two or more lighting devices 200. For example, the first group GR1 may include two or three lighting devices 200. Further, for example, the first group GR1 may include five or more lighting devices 200.

In the embodiment, a case is described in which the second group GR2 includes the eight lighting devices 200, and the present disclosure is not limited thereto. The second group GR2 may include two or more lighting devices 200. For example, the second group GR2 may include any number of the lighting devices 200 from two to seven. Further, for example, the second group GR2 may include nine or more lighting devices 200.

In the embodiment, a case is described in which the lighting devices 200 include the lighting device 200 provided in the first group GR1 and the lighting device 200 provided in the second group GR2, and the present disclosure is not limited thereto. The lighting devices 200 may include, for example, the lighting device 200 provided in a third group. The lighting devices 200 may include, for example, the lighting device 200 provided in the third group and the lighting device 200 provided in a fourth group.

Further, functional parts illustrated in FIG. 6 illustrate functional configurations, and a specific implementation form is not particularly limited. That is, there is no need to mount hardware corresponding to each functional part, and it is also possible to implement a configuration in which one processor executes programs to implement functions of a plurality of functional parts. In the above-described embodiment, a part of functions implemented by software may be implemented by hardware, or a part of functions implemented by hardware may be implemented by software. In addition, specific detailed configurations of the respective parts of the control device 400 can be freely changed without departing from the gist thereof.

The flowchart illustrated in FIG. 10 is divided into processing units according to main processing contents to facilitate understanding of the processing of the second controller 410 of the control device 400. The flowchart illustrated in FIG. 10 is not limited by how the flowchart is divided or by names of the processing units. The flowchart can be divided into a larger number of processing units according to the processing contents, or can be divided such that one processing unit includes more processing. A processing order of the flowchart is not limited to the illustrated example.

The display system 1 can be implemented by causing the second processor 410A provided in the control device 400 to execute the second control program PG2 corresponding to the display system 1. The second control program PG2 may be recorded in a computer-readable recording medium.

A magnetic or optical recording medium, or a semiconductor memory device may be used as the recording medium. Specific examples thereof include a fixed type recording medium or a removable recording medium such as a flexible disk, an HDD, a compact disk read only memory (CD-ROM), a DVD, a Blu-ray (registered trademark) disc, a magneto-optical disk, a flash memory, and a card type recording medium. Further, the recording medium may be a nonvolatile storage device such as an RAM, an ROM, or an HDD, which is an internal storage device provided in the control device 400.

The display system 1 can also be implemented by storing the second control program PG2 in a server device or the like and downloading the second control program PG2 from the server device to the control device 400.

APPENDIX

Hereinafter, a summary of the present disclosure will be appended.

(Appendix 1) A display system including: a first lighting device disposed at a first position of a ceiling; a second lighting device disposed at a second position of the ceiling different from the first position; a projector disposed at a specific position of the ceiling different from the first position and the second position and configured to project an image onto a predetermined position of a wall surface or a floor surface on which a part of a light from at least the first lighting device is incident; and a control device configured to control the first lighting device, the second lighting device, and the projector, in which the control device executes operations including: acquiring first position information indicating the first position, second position information indicating the second position, and predetermined position information indicating the predetermined position; accepting a first maximum light amount indicating a maximum value of a light amount of the first lighting device and a second maximum light amount indicating a maximum value of a light amount of the second lighting device; accepting a dimming level for adjusting the light amount of the first lighting device and the light amount of the second lighting device; and determining a correction value indicating a degree of contrast correction of the projector based on the first position information, the second position information, the predetermined position information, the first maximum light amount, the second maximum light amount, and the dimming level.

Accordingly, the correction value indicating the degree of the contrast correction of the projector is determined based on the first position information, the second position information, the predetermined position information, the first maximum light amount, the second maximum light amount, and the dimming level.

Accordingly, the appropriate correction value can be determined. Therefore, it is possible to improve visibility of the projector while ensuring brightness of the first lighting device and the second lighting device.

(Appendix 2) The display system according to Appendix 1, in which the control device further executes operations including: calculating, based on the first position information and the predetermined position information, a first distance that is a distance between the first position and the predetermined position and a first incident angle that is an angle at which the light emitted from the first lighting device is incident on the predetermined position; calculating, based on the second position information and the predetermined position information, a second distance that is a distance between the second position and the predetermined position and a second incident angle that is an angle at which a light emitted from the second lighting device is incident on the predetermined position; calculating a first light amount that is the light amount of the first lighting device based on the first maximum light amount and the dimming level; calculating a second light amount that is the light amount of the second lighting device based on the second maximum light amount and the dimming level; calculating, based on the first distance, the first incident angle, and the first light amount, a first influence degree indicating a degree of influence of the light emitted from the first lighting device on visibility of the image projected onto the predetermined position; and calculating, based on the second distance, the second incident angle, and the second light amount, a second influence degree indicating a degree of influence of the light emitted from the second lighting device on the visibility of the image projected onto the predetermined position, and the determining of the correction value includes: determining the correction value based on the first influence degree and the second influence degree.

Accordingly, since the correction value is determined based on the first influence degree and the second influence degree, the appropriate correction value can be determined. Therefore, it is possible to improve the visibility of the projector while ensuring the brightness of the first lighting device and the second lighting device.

(Appendix 3) The display system according to Appendix 2, in which the determining of the correction value includes: calculating, based on the first influence degree and the second influence degree, a lighting influence degree indicating a degree of influence of the light emitted from the first lighting device and the light emitted from the second lighting device on the visibility of the image projected onto the predetermined position; and determining the correction value based on the lighting influence degree.

Accordingly, since the correction value is determined based on the lighting influence degree, the appropriate correction value can be determined. Therefore, it is possible to improve the visibility of the projector while ensuring the brightness of the first lighting device and the second lighting device.

(Appendix 4) The display system according to any one of Appendix 1 to Appendix 3, in which the lighting influence degree has an upper limit value, and the control device further executes operations including: reducing at least one of the first light amount and the second light amount such that the lighting influence degree is equal to or less than the upper limit value when the lighting influence degree is larger than the upper limit value.

Accordingly, since at least one of the first light amount and the second light amount is reduced such that the lighting influence degree is the maximum influence degree or less, the brightness of the first lighting device and the brightness of the second lighting device can be appropriately controlled. Therefore, it is possible to improve the visibility of the projector while ensuring the brightness of the first lighting device and the second lighting device.

(Appendix 5) The display system according to any one of Appendix 1 to Appendix 4, in which when the second distance is larger than the first distance and the second incident angle is smaller than the first incident angle, the control device sets the lighting influence degree to the upper limit value or less by reducing at least the first light amount.

Accordingly, when the second distance is larger than the first distance and the second incident angle is smaller than the first incident angle, the first influence degree is larger than the second influence degree. Accordingly, by setting the lighting influence degree to the maximum influence degree or less by reducing at least the first light amount, the brightness of the first lighting device and the second lighting device can be appropriately controlled. Therefore, it is possible to improve the visibility of the projector while ensuring the brightness of the first lighting device and the second lighting device.

(Appendix 6) The display system according to any one of Appendix 1 to Appendix 5, further including: a third lighting device disposed at a third position different from the first position and the second position, in which when a third distance that is a distance between the third position and the predetermined position substantially coincides with the first distance, a third incident angle that is an angle at which a light emitted from the third lighting device is incident on the predetermined position substantially coincides with the first incident angle, and a third maximum light amount indicating a maximum value of a light amount of the third lighting device substantially coincides with the first maximum light amount, the control device further executes operations including: setting the first lighting device and the third lighting device as a first group; and performing control such that a third light amount that is the light amount of the third lighting device coincides with the first light amount.

Accordingly, when the first lighting device and the third lighting device are provided in the first group, the third light amount is controlled to coincide with the first light amount. Therefore, brightness of the third lighting device can be easily and appropriately controlled.

(Appendix 7) The display system according to Appendix 6, further including: a fourth lighting device disposed at a fourth position different from the first position, the second position, and the third position, in which when a fourth distance that is a distance between the fourth position and the predetermined position substantially coincides with the second distance, a fourth incident angle that is an angle at which a light emitted from the fourth lighting device is incident on the predetermined position substantially coincides with the second incident angle, and a fourth maximum light amount indicating a maximum value of a light amount of the fourth lighting device substantially coincides with the second maximum light amount, the control device further executes operations including: setting the second lighting device and the fourth lighting device as a second group different from the first group; and performing control such that a fourth light amount that is the light amount of the fourth lighting device coincides with the second light amount.

Accordingly, when the second lighting device and the fourth lighting device are provided in the second group, the fourth light amount is controlled to coincide with the second light amount. Therefore, brightness of the fourth lighting device can be easily and appropriately controlled.

(Appendix 8) The display system according to Appendix 7, in which the control device further executes operations including: accepting a priority for the first group and a priority for the second group; and setting a light amount of a lighting device provided in the second group to be larger than a light amount of a lighting device provided in the first group when the priority for the second group is higher than the priority for the first group.

Accordingly, when the second priority is higher than the first priority, the light amount of the lighting device provided in the second group is set to be larger than the light amount of the lighting device provided in the first group. Therefore, by appropriately setting the first priority and the second priority, the light amount of the lighting device provided in the first group and the light amount of the lighting device provided in the second group can be appropriately controlled.

(Appendix 9) A non-transitory computer-readable storage medium storing a program for controlling a first lighting device disposed at a first position of a ceiling, a second lighting device disposed at a second position of the ceiling different from the first position, and a projector disposed at a specific position of the ceiling different from the first position and the second position and configured to project an image onto a predetermined position of a wall surface or a floor surface on which a part of a light from at least the first lighting device is incident, the program causing a processor to execute operations including: acquiring first position information indicating the first position, second position information indicating the second position, and predetermined position information indicating the predetermined position; accepting a first maximum light amount indicating a maximum value of a light amount of the first lighting device and a second maximum light amount indicating a maximum value of a light amount of the second lighting device; accepting a dimming level for adjusting the light amount of the first lighting device and the light amount of the second lighting device; and determining a correction value indicating a degree of contrast correction of the projector based on the first position information, the second position information, the predetermined position information, the first maximum light amount, the second maximum light amount, and the dimming level.

Accordingly, the program described in Appendix 9 has the same effect as the display system described in Appendix 1.

(Appendix 10) A control device for controlling a first lighting device disposed at a first position of a ceiling, a second lighting device disposed at a second position of the ceiling different from the first position, and a projector disposed at a specific position of the ceiling different from the first position and the second position and configured to project an image onto a predetermined position of a wall surface or a floor surface on which a part of a light from at least the first lighting device is incident, the control device including: at least one processor, in which the at least one processor executes operations including: acquiring first position information indicating the first position, second position information indicating the second position, and predetermined position information indicating the predetermined position; accepting a first maximum light amount indicating a maximum value of a light amount of the first lighting device and a second maximum light amount indicating a maximum value of a light amount of the second lighting device; accepting a dimming level for adjusting the light amount of the first lighting device and the light amount of the second lighting device; and determining a correction value indicating a degree of contrast correction of the projector based on the first position information, the second position information, the predetermined position information, the first maximum light amount, the second maximum light amount, and the dimming level.

The control device described in Appendix 10 has the same effect as the display system described in Appendix 1.

What is claimed is:

1. A display system comprising:
- a first lighting device disposed at a first position of a ceiling;
- a second lighting device disposed at a second position of the ceiling different from the first position;
- a projector disposed at a specific position of the ceiling different from the first position and the second position and configured to project an image onto a predetermined position of a wall surface or a floor surface on which a part of a light from at least the first lighting device is incident; and
- a control device configured to control the first lighting device, the second lighting device, and the projector, wherein the control device executes operations including:
- acquiring first position information indicating the first position, second position information indicating the second position, and predetermined position information indicating the predetermined position;
- accepting a first maximum light amount indicating a maximum value of a light amount of the first lighting device and a second maximum light amount indicating a maximum value of a light amount of the second lighting device;
- accepting a dimming level for adjusting the light amount of the first lighting device and the light amount of the second lighting device; and
- determining a correction value indicating a degree of contrast correction of the projector based on the first position information, the second position information, the predetermined position information, the first maximum light amount, the second maximum light amount, and the dimming level.

2. The display system according to claim 1, wherein the control device further executes operations including:
- calculating, based on the first position information and the predetermined position information, a first distance that is a distance between the first position and the predetermined position and a first incident angle that is an angle at which the light emitted from the first lighting device is incident on the predetermined position;
- calculating, based on the second position information and the predetermined position information, a second distance that is a distance between the second position and the predetermined position and a second incident angle that is an angle at which a light emitted from the second lighting device is incident on the predetermined position;

calculating a first light amount that is the light amount of the first lighting device based on the first maximum light amount and the dimming level;

calculating a second light amount that is the light amount of the second lighting device based on the second maximum light amount and the dimming level;

calculating, based on the first distance, the first incident angle, and the first light amount, a first influence degree indicating a degree of influence of the light emitted from the first lighting device on visibility of the image projected onto the predetermined position; and calculating, based on the second distance, the second incident angle, and the second light amount, a second influence degree indicating a degree of influence of the light emitted from the second lighting device on the visibility of the image projected onto the predetermined position, and the determining of the correction value includes:

determining the correction value based on the first influence degree and the second influence degree.

3. The display system according to claim 2, wherein the determining of the correction value includes:

calculating, based on the first influence degree and the second influence degree, a lighting influence degree indicating a degree of influence of the light emitted from the first lighting device and the light emitted from the second lighting device on the visibility of the image projected onto the predetermined position; and determining the correction value based on the lighting influence degree.

4. The display system according to claim 3, wherein the lighting influence degree has an upper limit value, and the control device further executes operations including:

reducing at least one of the first light amount and the second light amount such that the lighting influence degree is equal to or less than the upper limit value when the lighting influence degree is larger than the upper limit value.

5. The display system according to claim 4, wherein when the second distance is larger than the first distance and the second incident angle is smaller than the first incident angle, the control device sets the lighting influence degree to the upper limit value or less by reducing at least the first light amount.

6. The display system according to claim 2, further comprising:

a third lighting device disposed at a third position different from the first position and the second position, wherein when a third distance that is a distance between the third position and the predetermined position substantially coincides with the first distance, a third incident angle that is an angle at which a light emitted from the third lighting device is incident on the predetermined position substantially coincides with the first incident angle, and a third maximum light amount indicating a maximum value of a light amount of the third lighting device substantially coincides with the first maximum light amount, the control device further executes operations including:

setting the first lighting device and the third lighting device as a first group; and performing control such that a third light amount that is the light amount of the third lighting device coincides with the first light amount.

7. The display system according to claim 6, further comprising:

a fourth lighting device disposed at a fourth position different from the first position, the second position, and the third position, wherein when a fourth distance that is a distance between the fourth position and the predetermined position substantially coincides with the second distance, a fourth incident angle that is an angle at which a light emitted from the fourth lighting device is incident on the predetermined position substantially coincides with the second incident angle, and a fourth maximum light amount indicating a maximum value of a light amount of the fourth lighting device substantially coincides with the second maximum light amount, the control device further executes operations including:

setting the second lighting device and the fourth lighting device as a second group different from the first group; and performing control such that a fourth light amount that is the light amount of the fourth lighting device coincides with the second light amount.

8. The display system according to claim 7, wherein the control device further executes operations including:

accepting a priority for the first group and a priority for the second group; and setting a light amount of a lighting device provided in the second group to be larger than a light amount of a lighting device provided in the first group when the priority for the second group is higher than the priority for the first group.

9. A non-transitory computer-readable storage medium storing a program for controlling a first lighting device disposed at a first position of a ceiling, a second lighting device disposed at a second position of the ceiling different from the first position, and a projector disposed at a specific position of the ceiling different from the first position and the second position and configured to project an image onto a predetermined position of a wall surface or a floor surface on which a part of a light from at least the first lighting device is incident, the program causing a processor to execute operations comprising:

acquiring first position information indicating the first position, second position information indicating the second position, and predetermined position information indicating the predetermined position;

accepting a first maximum light amount indicating a maximum value of a light amount of the first lighting device and a second maximum light amount indicating a maximum value of a light amount of the second lighting device;

accepting a dimming level for adjusting the light amount of the first lighting device and the light amount of the second lighting device; and determining a correction value indicating a degree of contrast correction of the projector based on the first position information, the second position information, the predetermined position information, the first maximum light amount, the second maximum light amount, and the dimming level.

10. A control device for controlling a first lighting device disposed at a first position of a ceiling, a second lighting device disposed at a second position of the ceiling different from the first position, and a projector disposed at a specific position of the ceiling different from the first position and the second position and configured to project an image onto a predetermined position of a wall surface or a floor surface on which a part of a light from at least the first lighting device is incident, the control device comprising:

at least one processor, wherein the at least one processor executes operations including:

acquiring first position information indicating the first position, second position information indicating the second position, and predetermined position information indicating the predetermined position;

accepting a first maximum light amount indicating a maximum value of a light amount of the first lighting device and a second maximum light amount indicating a maximum value of a light amount of the second lighting device;

accepting a dimming level for adjusting the light amount of the first lighting device and the light amount of the second lighting device; and determining a correction value indicating a degree of contrast correction of the projector based on the first position information, the second position information, the predetermined position information, the first maximum light amount, the second maximum light amount, and the dimming level.

* * * * *